United States Patent
Bowman et al.

(10) Patent No.: US 12,308,705 B2
(45) Date of Patent: May 20, 2025

(54) ROTOR FOR AN ELECTRIC MACHINE

(71) Applicant: ETA Green Power Limited, Hethel (GB)

(72) Inventors: Liam Bowman, Hethel (GB); Johannes Wolfgang Landgraf, Hethel (GB)

(73) Assignee: ETA Green Power Limited (GB)

( * ) Notice: Subject to any disclaimer, the term of this patent is extended or adjusted under 35 U.S.C. 154(b) by 343 days.

(21) Appl. No.: 17/847,668

(22) Filed: Jun. 23, 2022

(65) Prior Publication Data

US 2022/0416601 A1    Dec. 29, 2022

(30) Foreign Application Priority Data

Jun. 24, 2021  (GB) ........................................ 2109107
Jun. 24, 2021  (GB) ........................................ 2109110

(51) Int. Cl.
| | |
|---|---|
| *H02K 1/2783* | (2022.01) |
| *H02K 1/30* | (2006.01) |
| *H02K 1/32* | (2006.01) |
| *H02K 7/00* | (2006.01) |

(52) U.S. Cl.
CPC .............. *H02K 1/2783* (2022.01); *H02K 1/30* (2013.01); *H02K 1/32* (2013.01); *H02K 7/003* (2013.01)

(58) Field of Classification Search
None
See application file for complete search history.

(56) References Cited

U.S. PATENT DOCUMENTS

| | | | |
|---|---|---|---|
| 4,674,178 A | * | 6/1987 | Patel ...................... H02K 1/278 310/156.28 |
| 7,791,233 B1 | | 9/2010 | Attard |
| 8,207,640 B2 | | 6/2012 | Horng et al. |

(Continued)

FOREIGN PATENT DOCUMENTS

| | | |
|---|---|---|
| CN | 201966774 U | 9/2011 |
| CN | 205489868 U | 8/2016 |

(Continued)

OTHER PUBLICATIONS

Search and Examination Report for Application No. GB2109107.9, dated Dec. 14, 2022, 7 pages.

(Continued)

*Primary Examiner* — Bernard Rojas
(74) *Attorney, Agent, or Firm* — Barnes & Thornburg LLP

(57) ABSTRACT

A rotor for an electric machine is disclosed herein. The rotor comprises: a central shaft; a rotor drum arranged radially outward of the central shaft, wherein the rotor drum comprises a hollow cylinder for carrying permanent magnets on an inner and/or outer surface of the hollow cylinder, and wherein the rotor drum is coaxial with both the central shaft and a rotational axis of the rotor; and a cap arranged to couple the central shaft to the rotor drum to enable the rotor drum and central shaft to rotate together about the rotational axis. An inner portion of the cap is coupled to the central shaft at a first position along the length of the rotational axis, and an outer portion of the cap is coupled to the rotor drum at a second position along the length of the rotational axis. The first position is at a different length along the rotational axis to the second position.

18 Claims, 17 Drawing Sheets

(56) References Cited

U.S. PATENT DOCUMENTS

| | | | |
|---|---|---|---|
| 11,742,711 B1* | 8/2023 | Turgut | H02K 15/03 310/156.08 |
| 2005/0040721 A1 | 2/2005 | Kusase et al. | |
| 2006/0022541 A1* | 2/2006 | Ong | H02K 7/003 310/156.31 |
| 2008/0088195 A1* | 4/2008 | Dooley | H02K 1/2791 310/67 R |
| 2008/0284275 A1 | 11/2008 | Dowhan | |
| 2014/0111052 A1 | 4/2014 | Wu et al. | |
| 2014/0175912 A1 | 6/2014 | Germann et al. | |
| 2015/0252507 A1 | 9/2015 | Kim et al. | |
| 2020/0036246 A1 | 1/2020 | Saban | |
| 2020/0162003 A1 | 5/2020 | Takahashi et al. | |

FOREIGN PATENT DOCUMENTS

| | | |
|---|---|---|
| CN | 110676976 A | 1/2020 |
| CN | 112510875 A | 3/2021 |
| EP | 3355451 A1 | 8/2018 |
| GB | 2505473 A | 3/2014 |
| GB | 2586329 A | 2/2021 |
| JP | S50139910 A | 11/1975 |
| JP | 2010098891 A | 4/2010 |
| JP | 2017163752 A | 9/2017 |
| KR | 20050066540 A | 6/2005 |
| RU | 2148887 C1 | 5/2000 |
| WO | 2011002979 A2 | 1/2011 |
| WO | 2011032201 A1 | 3/2011 |
| WO | 2017173188 A1 | 10/2017 |
| WO | 2020076185 A1 | 4/2020 |

OTHER PUBLICATIONS

Partial Search Result for Application No. 22180804.1, dated Dec. 20, 2022, 10 pages.
Extended European Search Report for Application No. 22180804.1-1202 / 4123882, dated May 10, 2023, 19 pages.
Combined Search and Examination Report for Application No. GB2301831.0, dated Apr. 21, 2023, 9 pages.
Combined Search and Examination Report for Application No. GB2109107.9, dated Mar. 29, 2022, 14 pages.
Combined Search and Examination Report for Application No. GB2109110.3, dated Mar. 29, 2022, 10 pages.
Extended European Search Report for Application No. 23181098.7-1202/4236038, dated Oct. 24, 2023, 15 pages.
Invitation to Respond to Written Opinion for Application No. 10202250272V; dated Oct. 7, 2024, 14 pages.

\* cited by examiner

ROTOR FOR AN ELECTRIC MACHINE

PRIORITY CLAIM

This application claims priority to United Kingdom Application No. 2109110.3, filed Jun. 24, 2021, and United Kingdom Application No. 2109107.9, filed Jun. 24, 2021, which application is hereby incorporated in its entirety herein.

TECHNICAL FIELD

The present disclosure relates to the field of rotors for electric machines.

BACKGROUND

Electric machines, such as motors, are configured to convert electrical energy into mechanical energy. Electric machines typically include a stator and a rotor. The stator surrounds the rotor and includes one or more windings. The rotor has one or more magnets and is coupled to a shaft. By applying current through the windings of the stator, the resulting magnetic field interacts with the magnets of the rotor to drive rotation of the rotor and shaft.

Today small but powerful electric motors are used in many different mobile applications like in lawn mowers or in battery or hybrid powered vehicles. In former times such machines had been driven mostly by combustion engines.

The big masses in a motor are the rotor, the magnets, the winding, the flux ring and the housing. In a traditional way the rotor of a permanent magnet motor is made from laminate steel, but this is heavy. Many prior art inventions succeeded in building lightweight rotors in order to improve acceleration, but this was focused on rotors which carry the active winding, like Faulhaber motors.

U.S. Pat. No. 3,735,174 (Bösch a. Blocher 1969) describes a motor with a hollow rotor which uses a hollow cylinder, but here the field penetrates the cylinder which carries the thin layer of rotor winding and comprising a high permeability flux part inside of this cylinder. Here the thin-walled cylinder is supporting the cylindrical coil and it transfers the torque from the coil to the shaft. It has an inner stator and an external stator. The weight reduction is achieved for the winding and the rotor, but the total weight of the motor is still high, due to the inner stator. Further weight reduction is needed.

U.S. Pat. No. 4,103,196 (Panasonic 1975) describes a coreless DC motor which is designed to have no laminate iron core. The rotor windings are wound in a skewed pattern or in a honeycomb pattern to create a self-supporting cylinder. Here we have a hollow rotor with low mass but there is also an inner stator for magnetic return. And this does not show a highly stable mechanical combination of cylindrical drum, cap discs and rotor.

SUMMARY

Aspects of the disclosure are set out in the independent claims and optional features are set out in the dependent claims. Aspects of the disclosure may be provided in conjunction with each other, and features of one aspect may be applied to other aspects.

In an aspect, there is provided a rotor for an electric machine, wherein the rotor comprises: a central shaft; a rotor drum arranged radially outward of the central shaft, wherein the rotor drum comprises a hollow cylinder for carrying permanent magnets on an inner and/or outer surface of the hollow cylinder, and wherein the rotor drum is coaxial with both the central shaft and a rotational axis of the rotor; and a cap arranged to couple the central shaft to the rotor drum to enable the rotor drum and central shaft to rotate together about the rotational axis. An inner portion of the cap is coupled to the central shaft at a first position along the length of the rotational axis, and an outer portion of the cap is coupled to the rotor drum at a second position along the length of the rotational axis. The first position is at a different length along the rotational axis to the second position.

Embodiments may provide a reduced weight for the rotor, while providing increased stability during rotation. In turn, this may lead to a more efficient conversion between electrical energy in a stator and kinetic energy in the rotor. For example, the rotor may be part of a motor, in which case, application of current to windings of the stator may cause the rotor to rotate. For example, the rotor may be part of a generator, in which case, rotation of the rotor may current to be induced in the windings of the stator.

The cap may have a non-uniform material thickness. For example, the thickness of the cap may vary depending on its radial position (e.g. how far away from the rotational axis it is) and/or the thickness of the cap may vary depending on its angular position (e.g. which direction away from the rotational axis it is). The cap may have at least one spoke extending between the inner portion of the cap and the outer portion of the cap. For example, the spoke may extend radially outward. The spoke may extend radially outward in a constant direction (e.g. to provide a straight radial spoke). Each of the at least one spokes may be adjacent to an aperture in the cap. For example, the cap may have one or more apertures to reduce weight of the cap, and the apertures may be separated by spokes. The cap may comprise a plurality of spokes and a plurality of apertures. The spokes in the cap may be distributed uniformly about the rotational axis of rotor. For example, the cap may comprise a plurality of radial spokes (spokes extending radially outward from the centre). The radial spokes may be straight (e.g. they extend radially outward in the same direction along their length) or they may be curved (e.g., cup-shaped). The distribution of spokes and/or apertures may be symmetric about the cap. The central shaft may be provided as part of a rotor hub. The cap may be provided at one end of the central shaft.

The cap may be a first cap and the rotor may further comprise a second cap. The second cap may be arranged to couple the central shaft to the rotor drum. The second cap may be offset from the first cap along the rotational axis of the rotor. An inner portion of the second cap may be coupled to the central shaft at a third position along the length of the rotational axis. An outer portion of the second cap may be coupled to the rotor drum at a fourth position along the length of the rotational axis. The third position may be at a different length along the rotational axis to the fourth position. The second position may be closer to the fourth position than the third position on the rotational axis of the rotor. The distance between the first and second position on the rotational axis of the rotor may be the same as the distance between the third and fourth position on the rotational axis of the rotor. For example, two caps may be provided, and the caps may be mirror versions of each (about a plane perpendicular to the rotational axis of the rotor). Each or both caps may provide a taper, so that the rotor tapers at the end of that cap from a narrower width (nearer to the end) to a wider width (further away from that end). For example, the rotor may comprise two tapered spoked caps for coupling the central shaft to the rotor drum.

An outer diameter of the central shaft may vary along its length. An inner diameter of the first cap may be different to an inner diameter of the second cap. The second position on the rotational axis of the rotor may be closer to a central region of the shaft than the first position. An internal volume of the hollow cylinder may be at least partially filed with a lightweight non-magnetic material. The material may comprise a porous medium, such as a foam. The central shaft may be hollow. The rotor may be arranged to receive a coolant through the hollow central shaft to provide cooling to the rotor drum. The rotor may be arranged to carry the permanent magnets on an outer surface of the hollow cylinder. The rotor may further comprise a liner arranged radially outward of the magnets to secure the magnets to the hollow cylinder. The rotor may be arranged to carry the permanent magnets on an inner surface of the hollow cylinder, and wherein one of: (i) the outer portion of the cap may be arranged to couple to the magnets to hold the magnets in place on the inner surface of the hollow cylinder; and (ii) the outer portion of the cap may be arranged to couple to the hollow cylinder. The cap may comprise a magnet contacting portion between its inner and outer portions and arranged to contact the magnets to hold the magnets in place on the inner surface.

An outer diameter of the hollow cylinder may remain constant along the length of the rotational axis. An inner diameter of the hollow cylinder may vary along the length of the rotational axis. The inner diameter may be larger at one or both of the axial ends of the hollow cylinder than in a central region of the hollow cylinder along the rotational axis of the rotor. An inner surface of the rotor drum may comprise one or more recesses for receiving the cap therein. The rotor may comprise a plurality of permanent magnets carried by the rotor drum. The permanent magnets may be arranged in a Halbach array on the inner and/or outer surface of the hollow cylinder. The cap may comprise at least one feature configured to be detected by a sensor to identify a rotational position of the rotor for controlling operation of a stator. A thickness of the material of the hollow cylinder may be approximately the same as a thickness of the material of the cap.

In another aspect of the disclosure there is provided a rotor for an electric machine, wherein the rotor is configured to rotate about a rotation axis. The rotor comprises a rotor drum for supporting permanent magnets thereon, the rotor drum having a longitudinal axis coaxial with the rotation axis, a hub nested within the rotor drum for supporting the rotor drum, the hub being coaxial with the rotor drum, and at least one cap or spoke coupling the rotor drum to the hub. The rotor comprises an array of permanent magnets coupled to the inside of the rotor drum, and wherein the magnets in the array are arranged to form a Halbach array.

Aspects of the present disclosure may provide an electric machine having a rotor as described herein. The electric machine also comprises a stator comprising a plurality of windings arranged to interact with permanent magnets carried by the hollow cylinder of the rotor drum; and a housing configured to house the rotor and the stator. The housing comprises at least one bearing assembly arranged to permit rotation of the rotor about its rotational axis relative to the stator and the housing. The cap may comprise a first cap and wherein the rotor may further comprise a second cap arranged to couple the central shaft to the rotor drum. The housing may comprise two bearing assemblies: a first bearing assembly may be provided at a first end of the housing and central shaft, and a second bearing assembly may be provided at a second end of the housing and central shaft opposite to the first end; and an inner portion of the first cap may be coupled to the central shaft at a location proximal to the first bearing assembly and an inner portion of the second cap may be coupled to the central shaft at a location proximal to the second bearing assembly.

In another aspect there is provided a rotor for an electric machine, wherein the rotor is configured to rotate about a rotation axis. The rotor comprises a rotor drum supporting an array of permanent magnets thereon, the rotor drum having a longitudinal axis coaxial with the rotation axis; and a hub nested within the rotor drum for supporting the rotor drum, the hub being coaxial with the rotor drum and coupled thereto. The magnets in the array are arranged to provide a Halbach array comprising a series of alternating polarity permanent magnets separated by pusher permanent magnets therebetween, the pusher permanent magnets having a polarity transverse to the alternating polarity permanent magnets. The pusher magnets have a thickness in the radial direction that is less than the thickness in the radial direction of the alternating polarity magnets. The rotor drum comprises a series of alternating castellations in circumferential direction, the protrusions arranged to support the alternating polarity magnets and the recesses arranged to support the pusher magnets.

The dimensions of the alternating castellations are selected such that the alternating polarity magnets and pusher magnets mounted on the respective protrusions and in the respective recesses have the same radial extent. The rotor may also comprise a wrapping or winding layer extending around the circumference of the rotor drum and around the permanent magnets, wherein the wrapping or winding layer is arranged such that, when the rotor is spinning about the rotation axis in use, the wrapping or winding layer at least partially counters the centrifugal forces acting on the permanent magnets.

In another aspect there is provided a rotor for an electric machine. The rotor is configured to rotate about a rotation axis. The rotor comprises a rotor drum for supporting permanent magnets thereon, the rotor drum having a longitudinal axis coaxial with the rotation axis, a hub nested within the rotor drum for supporting the rotor drum, the hub being coaxial with the rotor drum, and at least one spoke forming a frustoconical disc coupling the rotor drum to the hub.

In some examples the rotor comprises a second spoke coupling the rotor drum to the hub at a second distance along the longitudinal axis. The second spoke may form a frustoconical disc.

In some examples the rotor comprises a cavity bounded by the at least one spoke, the hub and the rotor drum. The cavity may be configured to receive a coolant therewithin. The cavity may be at least partially filled with porous low-density material, such as foamed aluminium.

In some examples one or more apertures extend through the spoke disc so as to reduce the mass of material of the spoke. The apertures may be shaped/angled to draw fluid in or expel fluid out from cavity.

In some examples the first and second spokes are mirror images of each other about a plane transverse to the rotation axis.

In some examples the at least one spoke is at an acute angle relative to the rotation axis, for example, between 3 and 30 degree.

In some examples the rotor comprises an array of permanent magnets coupled to the rotor drum, and wherein the magnets in the array are arranged to form a Halbach array. The array of magnets may be arranged inside the rotor drum and/or on the rotor drum.

In some examples the rotor comprises a wrapping or winding layer extending around the circumference of the rotor drum and around array of magnets, wherein the wrapping or winding layer is arranged such that, when the rotor is spinning about the rotation axis in use, the wrapping or winding layer at least partially counters the centrifugal forces acting on the permanent magnets. The winding layer may have a high tensile strength, for example the winding layer may comprise or consist of stainless steel or fiber-reinforced polymer.

In some examples the thickness of the spoke disc in the longitudinal or rotation axis is approximately the same as the thickness of the rotor drum in a radial direction orthogonal to the longitudinal axis. In some examples the thickness of the spoke disc in the longitudinal or rotation axis is equal to or less than 10% of the axial length of the drum, preferably less than 5% of the drum length. In some examples the length of the rotor drum in the longitudinal axis is greater than the radius of the spoke disc from the hub to the rotor drum.

In some examples the hub is mounted on the shaft via an interference fit.

In some examples a recess is formed between at least one of the spokes and the hub, and wherein the recess houses a rotor position sensor mounted in the recess such that the rotor position sensor is at least partially nested within the longitudinal extent of the rotor drum, and wherein the spoke comprises a rotor position indicator for indicating the position of the rotor to the rotor position sensor, wherein the rotor position sensor is located in the recess.

In some examples the rotor comprises an inner flux ring coupled to the rotor drum configured to provide a reduction of eddy currents from magnets coupled to the drum. Additionally, or alternatively, in some examples the rotor comprises an outer flux ring coupled to the rotor drum and around the permanent magnets.

In some examples the rotor drum, the hub and the at least one spoke are integrally formed. For example, they may be cast, extruded, 3D printed, or made from fiber-reinforced composite.

In another aspect there is provided a wide gap DC electric motor comprising the rotor of any of the aspects described above.

FIGURES

Some examples of the present disclosure will now be described, by way of example only, with reference to the figures, in which.

In the drawings like reference numerals are used to indicate like elements.

Specific Description

Embodiments of the present disclosure are directed to rotors for electric machines with increased performance for rotation. Embodiments may also utilise a Halbach array of magnets on the rotor.

One example of a rotor will now be described with reference to FIG. 1.

Figure 1:
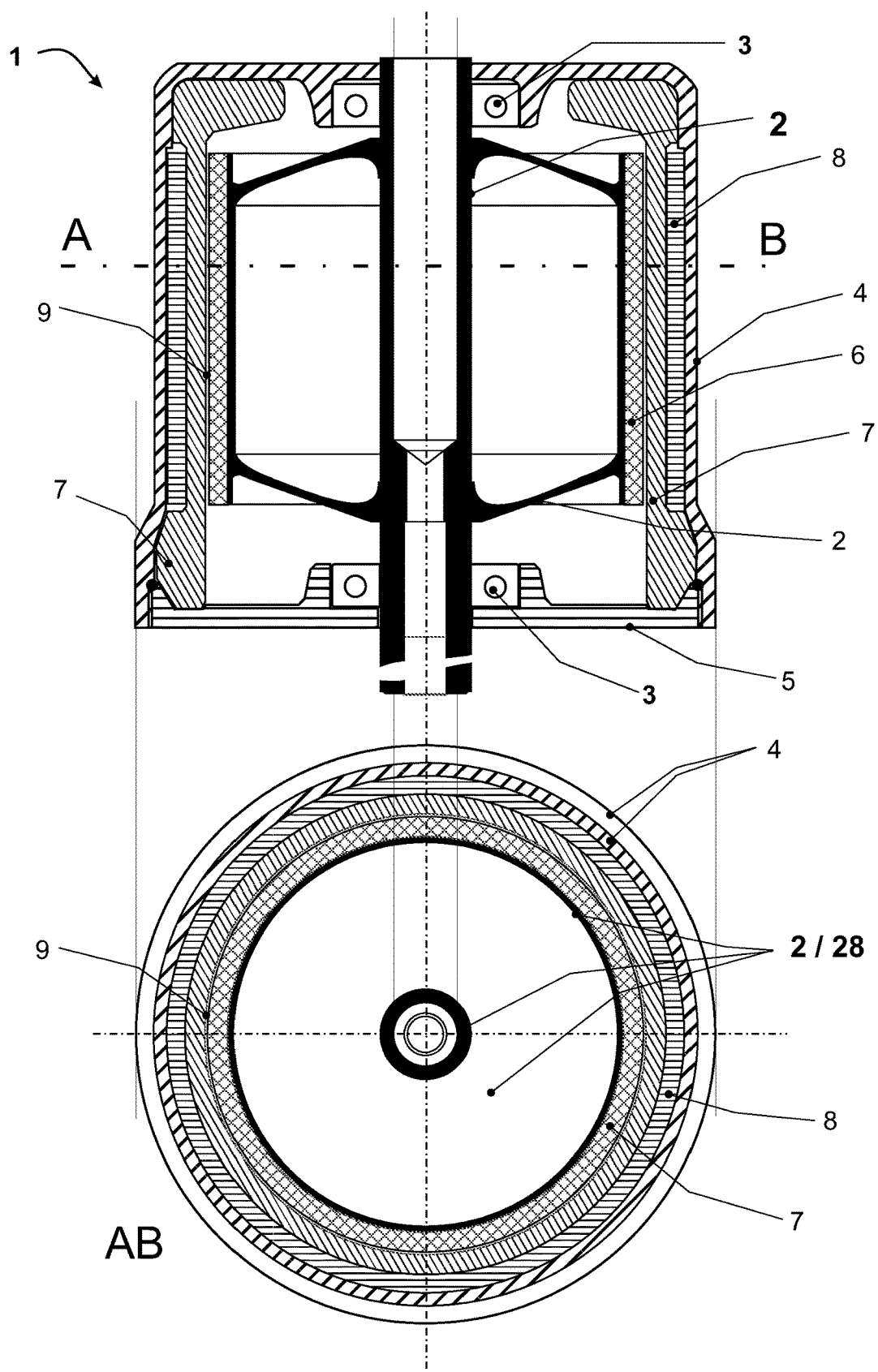
FIG. 1 shows a hollow cap rotor inside of a stator and housing.
Figure 2:
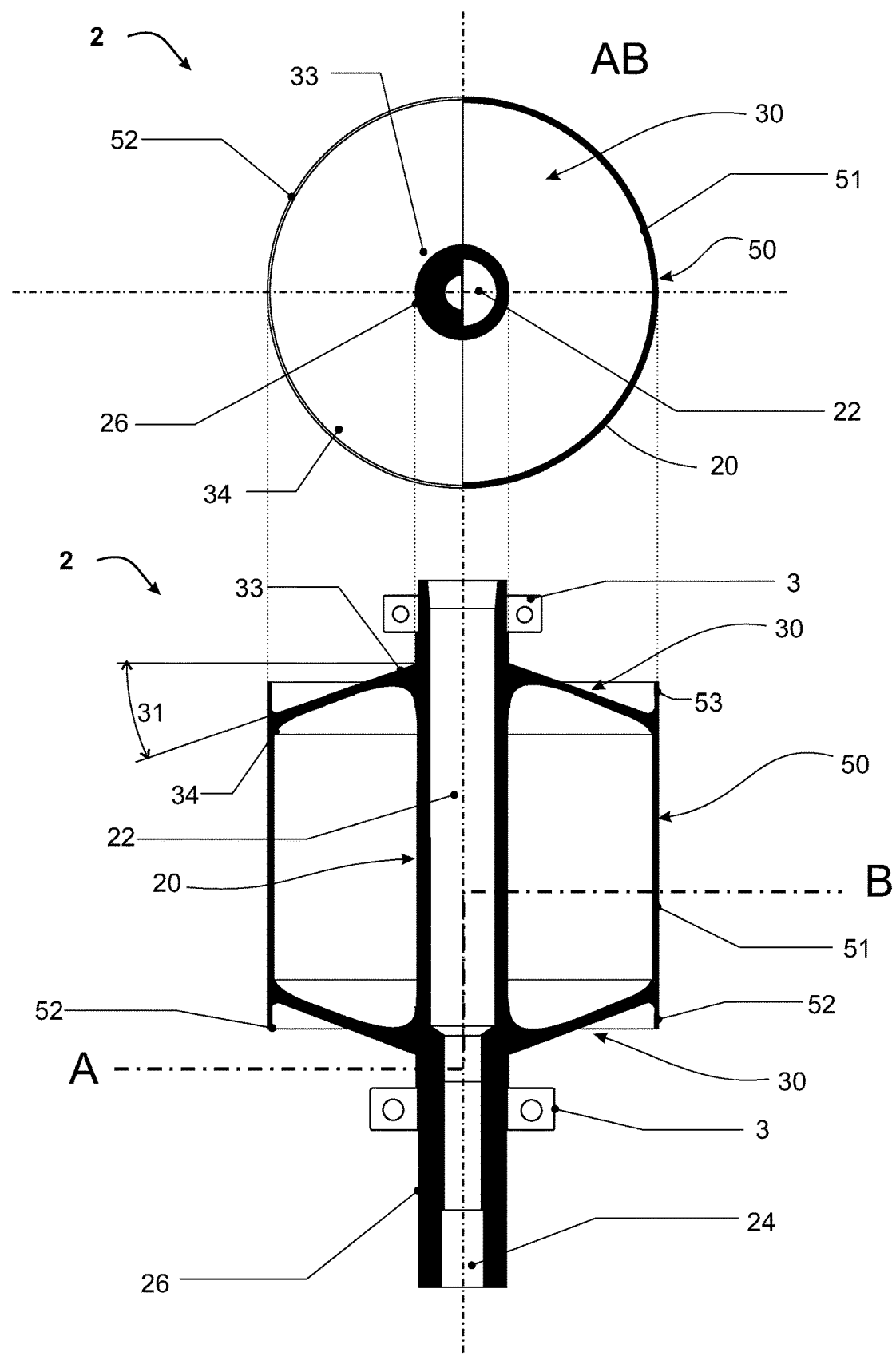
FIG. 2 shows a hollow cap rotor with a drum part and a cap part and a shaft part which is made without interfaces as a one-piece device.

FIG. 1 shows a cross-section of an example electric motor 1 comprising a hollow cap rotor 2 (the rotor 2 is shown in more detail in FIG. 2 below). The rotor 2 is positioned by a pair of bearings 3 inside of a housing 4. The housing 4 comprises a flux ring 8 and a stator winding 7 which is inside the flux ring 8. The rotor 2 sits inside the stator winding 7 and is separated by an airgap 9. A bottom plate 5 is used to close the housing 4 and fix/support the bearings 3 of the rotor 2.

Figure 8:
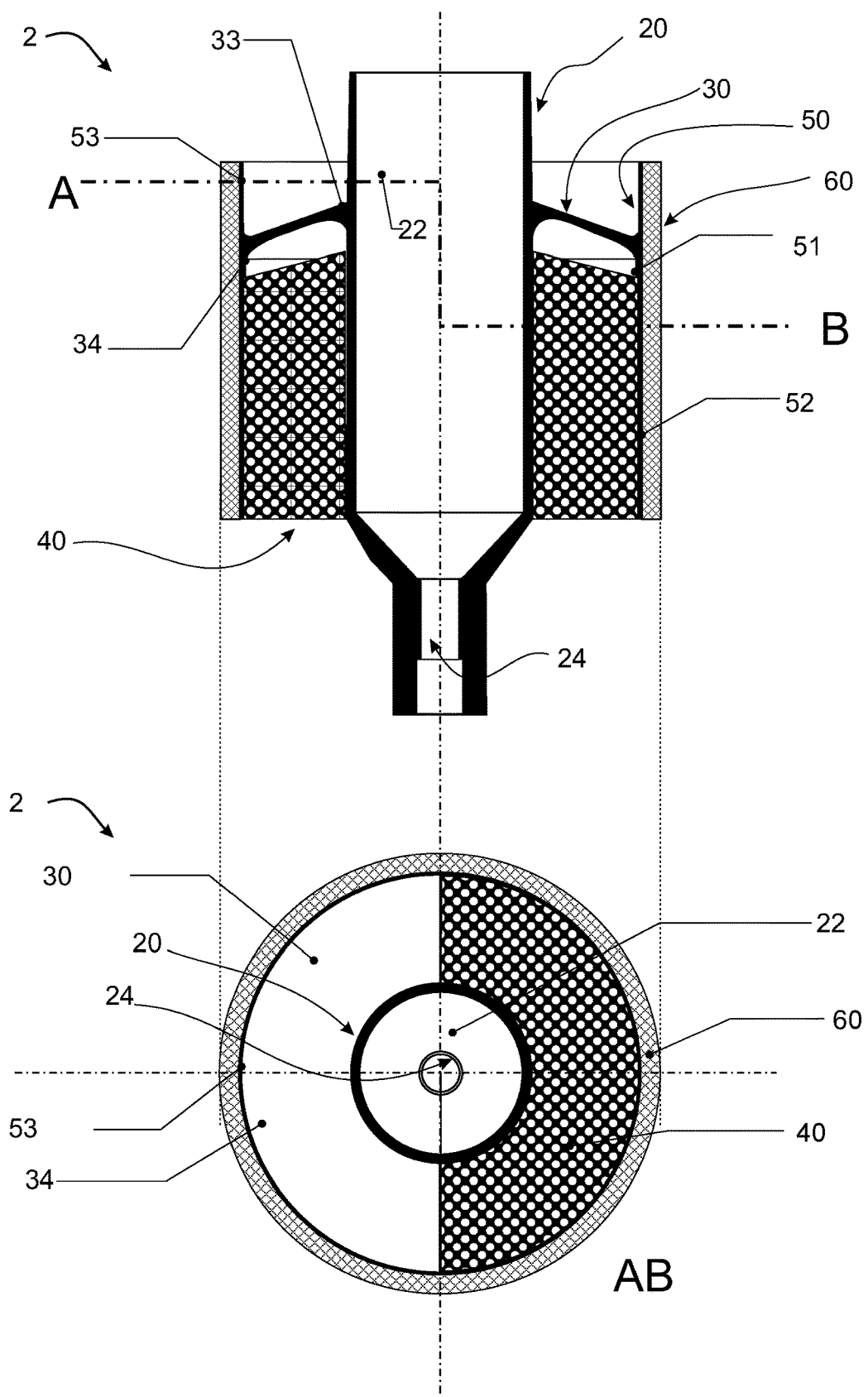
FIG. 8 shows a hollow cap rotor comprising a cylindrical drum part comprising very thin compact walls and a foamy or spongious structure inside of the drum part.

The rotor 2 provides a rotor drum 50 that carries a magnet array 6 on its outside, although it will be understood that in other examples the magnet array 6 may be carried on the inside of the rotor drum 50. In the example shown the magnet array 6 is a Halbach array. The rotor 2 comprises a hub 20, which is made up of a central shaft for rotating about a rotational axis of the rotor. The rotor 2 also includes two caps 30 (shown better in FIG. 2) a drum part or rotor drum 50. The two caps 30 support the rotor drum 50 and couple it to the hub 20. The two caps 30 and the rotor drum 50 therefore bound a cavity that may be hollow or may be filled with a filler material 40 as shown in FIG. 8 (and as will be described in more detail below). The filler material 40 may be a coolant and/or a low-density material such as foamed aluminium. In the example shown, the rotor drum 50 is cylindrical and is coaxial with the hub 20.

Figure 6:
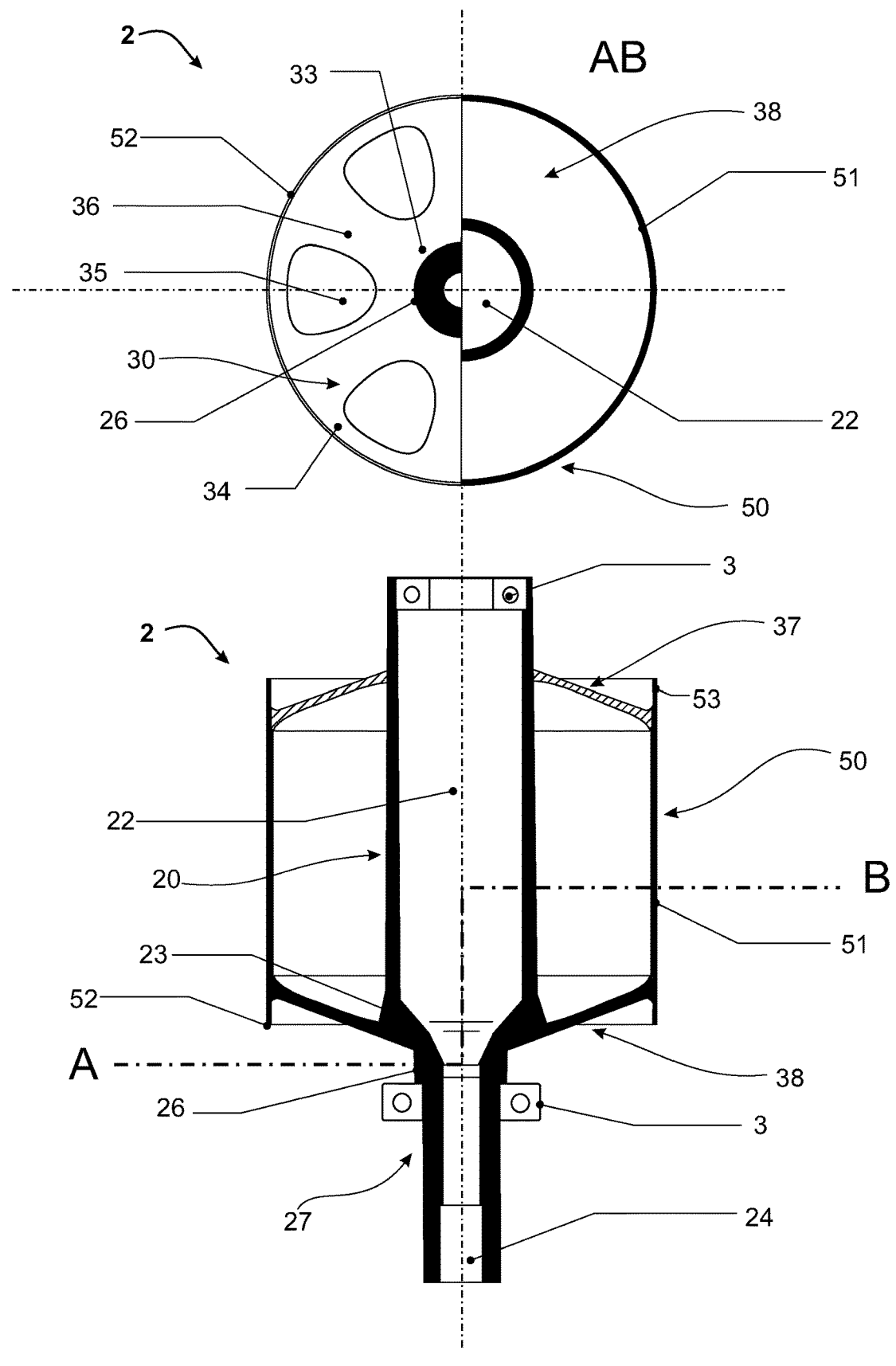
FIG. 6 shows a rotor with a shaft part which is shaped like a reverse bottle with thin walls. Here the bearing is outside shaft at one end and inside the shaft at the other end.

In the example shown, the two caps 30 are mirror images of each other about an axis transverse to the rotation axis or longitudinal axis of the rotor drum 50. In the example shown the two caps 30 are each at an acute angle relative to the rotational axis of the rotor 2. For example, the caps 30 each extend from an inner region where they are coupled to the hub 20 to an outer region where they are coupled to the drum 50. Each inner region is located at a different position along a length of the rotational axis to the outer region. As such the caps 30 are tapered. As shown, they are tapered outwards so that each narrower end (inner region) of the caps 30 is located closer to its respective end of the central shaft than the wider end (outer region) of the cap. In the example shown, the two caps 30 each form respective solid frusto-conical discs. However, it will be understood that in other examples the caps 30 may not each form a solid disc but may form a disc-like shape from discrete elements—for example, each cap 30 may comprise a series or plurality of spoke-like elements (similar to a bicycle wheel, for example). It will also be appreciated that these need not be frustoconical. Instead, other geometries may be provided (e.g. in which an inner region is axially offset from an outer region). When a plurality of spokes are provided, these may be arranged to form a frustoconical disc-like shape but with discrete gaps or apertures therebetween. In some examples the caps 30 may comprise one or more apertures (for example as shown in FIG. 6 described below in more detail) so as to reduce the mass of material of the cap 30 and/or to entrain fluid (such as air) into the cavity bounded by the rotor drum 50, for example to aid in cooling.

The radial thickness of the stator winding 7 between the drum part 50 of the rotor 2 and the flux ring 8 is almost as thick as the radial thickness of the flux ring 8 or even thicker than the flux ring 8. The length and diameter of the rotor drum 50 may be in the same magnitude (as shown in FIG. 1) but it will be understood that in other examples the length of the rotor drum 50 may be substantially longer than the diameter of the drum as well.

The rotor 2 with magnet array 6 shown in FIG. 1 is designed for free rotation about the pair of bearings 3 without touching the stator winding 7 and is separated by from the stator winding 7 by a free air gap 9. The machine 1 with the rotor 2 inside can work as a motor and as a generator as well. The rotor 2 is designed to transfer power or load to another rotating part like a mower blade or a traction wheel via load bearing connector 34 coupled to load bearing portion 26 of the shaft 20. The stator winding 7 preferably is a radially thick gapless winding (shown) but also could be a different type of winding (not shown).

As noted above, FIG. 2 shows a cross section of the rotor 2 of FIG. 1 in more detail (magnet array 6 not shown). As can be seen in the FIG., the rotor drum 50 is relatively thin (thinner than the thickness of each cap 30). In the example shown the rotor drum 50, the caps 30 and hub 20 are integrally formed (for example from the same material) such that they form a one-part device. In the example shown the hub 2 forms a hollow shaft (forming a cavity 22 inside) which is not essential but may reduce weight without losing much stability. For example, the rotor 2 can be manufactured by 3D printing or other additive technologies.

The caps 30 are coupled to the hub 20 at a first connection area 33 and to the rotor hub 50 at a second connection area 34. The mostly ring-shaped connection areas 33 and 34 may be formed in a stress optimized geometry. To allow milling or less expensive manufacturing technologies the design of the caps 30 may be optimized (see FIG. 7). The cap 30 shows a conical design with a conical angle 31 away from the flat perpendicular rotational plane (i.e. at an angle 31 relative to a plane transverse to the rotation axis of the rotor 2). The conical angle 31 is preferred to obtain a higher stability against bending forces and a better load transmission between the shaft 20 and the drum 50. The first and second connection areas 33, 34 of the caps 30 are designed for stress reduction and are slightly thicker than the main wall part of the caps 30 that is between the two connection areas 33, 34.

In the example shown the rotor hub 50 extends in the longitudinal or rotation axis beyond where each cap 30 couples to the hub at the second connection area 34. This leaves a first overhang 52 at a proximal end of the rotor drum 50 and a second overhang 53 at the distal end of the rotor drum 50. In the example shown the caps 30 are configured to splay inwards relative to each other—that is, the connection area 33 of the caps 30 with the hub 20 are at a greater separation from each other in the longitudinal or rotation axis than the connection area 34 of the caps 30 with the rotor drum 50. However, it will be understood that in other examples (such as that shown in FIG. 11 and described in more detail below) the caps 30 may splay in the opposite direction such that the connection area 33 of the caps 30 with the hub 20 are closer to each other in the longitudinal or rotation axis than the connection area 34 of the caps 30 with the rotor drum 50.

Figure 3:
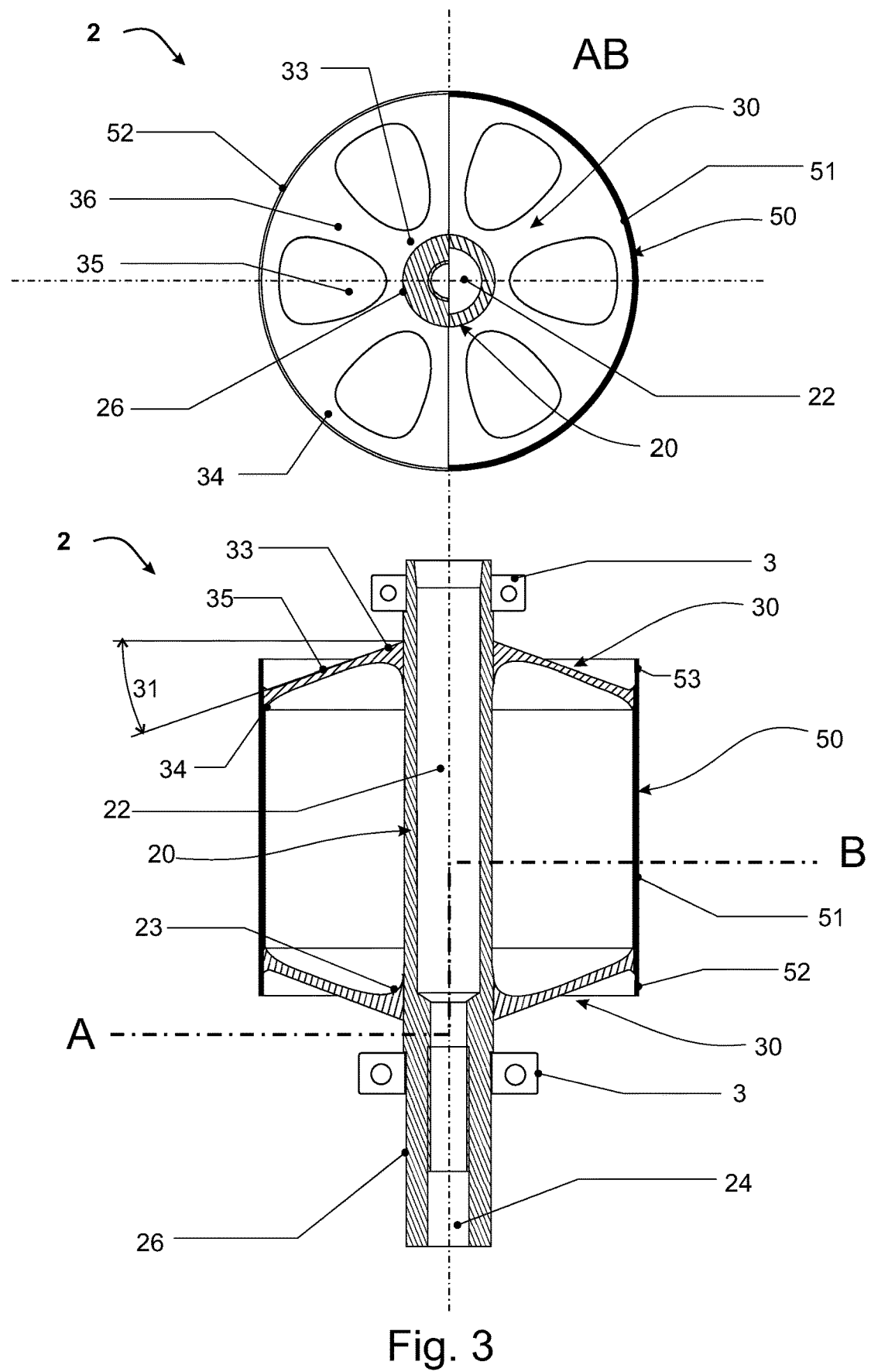
FIG. 3 shows a hollow cap rotor with a cylindrical drum part and two spoked cap parts and a shaft part where the parts are manufactured separately and mounted and fixed during rotor production.

FIG. 3 shows another example of a rotor 2 with a rotor drum 50 and two caps 30 and a shaft 20 where these four parts are manufactured separately and mounted and fixed during rotor production. In this example each cap 50 comprises a plurality of apertures 35. The apertures 35 reduce the weight of the rotor 2 and may permit fluid such as air to flow into the cavity bounded by the caps 30 and the rotor drum 50 to aid in cooling of the rotor 2. In this example the apertures 35 are formed in the wall part of the caps 30 between each of the connection areas 33, 34. In the example shown the apertures 35 are generally D-shaped, but it will be understood that in other examples the apertures may take other shapes and forms such as a teardrop-shape. For example, the portions of the cap 30 which couple the inner region of the cap to the outer region of the cap may comprise spokes. The spokes may extend radially outward from an inner region to an outer region, e.g. they may extend straight out (in a constant direction).

The connection areas 33, 34 between the parts in this example are designed to create a press fit and/or a glue fit, additionally or alternatively the interfaces could also be designed to create a welding fit and the welding could be performed from outside. The manufacturing of the parts can be done by casting, pressure moulding, forging, milling or other available methods. We call this version one piece per part. The materials of the parts may be the same or different, according to potentially different material optimization results for drum part, cap part and shaft part. The connection areas 33, 34 are designed for stress reduction and for better mounting. For better stability gluing materials like polymers or welding materials may be added in the connecting areas 33 and 34 of the parts, especially when mounting the cap parts 30.

Figure 4:
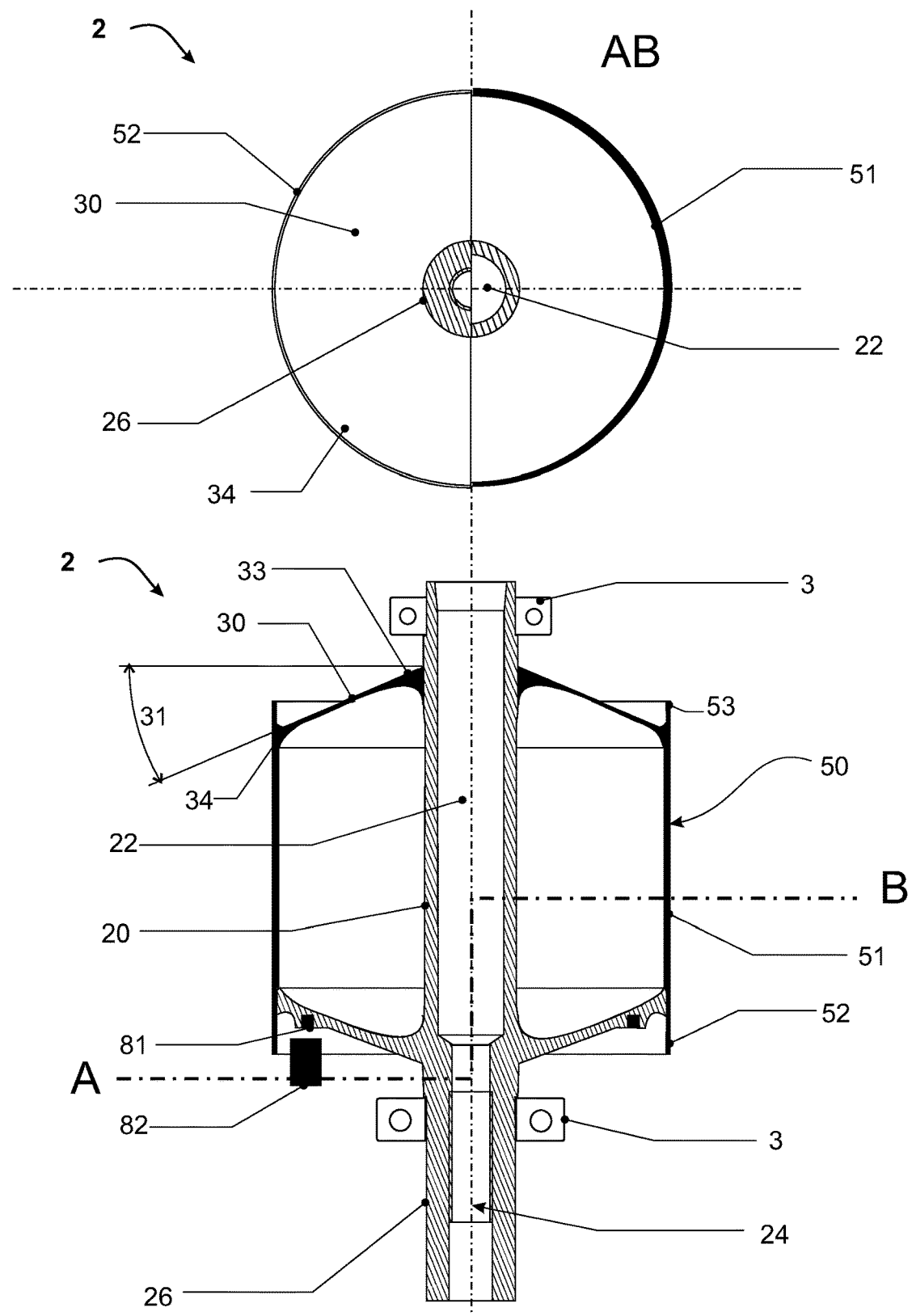
FIG. 4 shows a hollow cap rotor comprising two combined parts, one combined part comprising shaft part and cap part and another combined part comprising drum part and cap part.

FIG. 4 shows another example of a rotor 2 that is made in a "two-part" design. The example rotor 2 shown in FIG. 4 comprises two pieces each comprising two parts of the rotor 2. One piece which is a combined part, comprises a shaft part 20 and first cap 30. The other piece comprises the rotor drum 50 and second cap 30. The two combined pieces may be pushed or screwed or pressed or welded together, then forming a rotor 2 with two ring shaped interfaces between the pieces, comprising in total the rotor drum 50, the caps 30 and the shaft 20 in a high stability but low weight and low-cost design.

In the example shown one of the caps 30 comprises a circumferential pattern or structure 81 which may be detected by a rotor position sensor 82. The circumferential pattern or structure 81 may be a geometrical or optical structure or a multitude of magnets which may be detected by a hall sensor. In the example shown in FIG. 4 the circumferential pattern or structure 82 is formed in a recess between the cap 30 and the overhang 52 of the rotor drum 50. During rotation of the rotor 2 the rotor position sensor 82 is designed to give a precise sensor signal while sensing the passing circumferential pattern or structure 81. The rotor position sensor 82 may also use the magnetic field of the magnet array 60 which is part of the rotor 2 (not shown).

Figure 5:
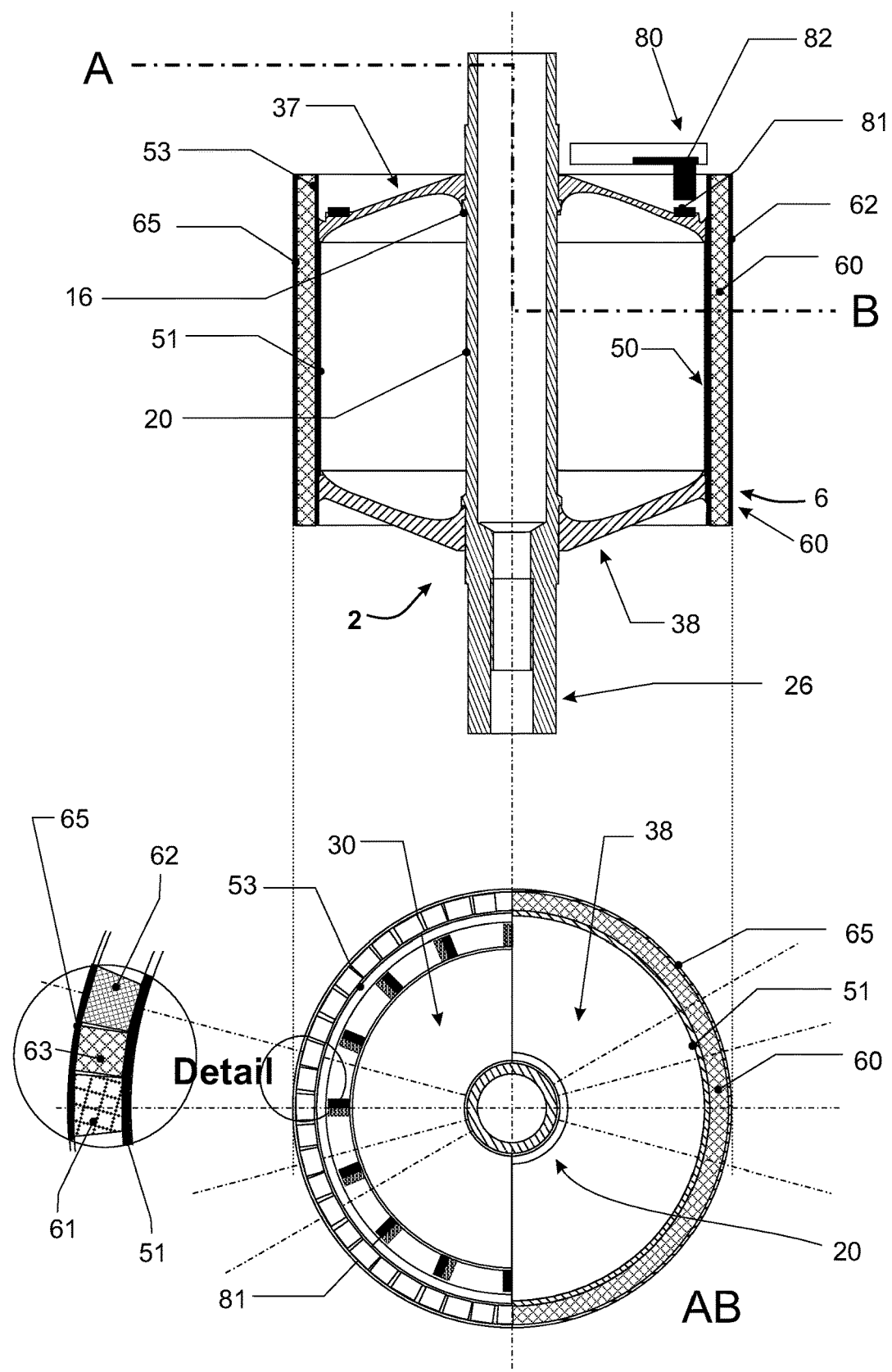
FIG. 5 shows a combined rotor with a magnet array. The detail shows a Halbach magnet array and a magnet cover which may be a thin steel liner.

FIG. 5 shows another example of a rotor 2 with a cylindrical magnet array 60 mounted on the outside of the rotor drum 50. The magnet array 60 is surrounded by a magnet cover 65 which may be a wrapping or winding layer, made for example from a thin sheet metal liner or a carbon fiber reinforced liner, to hold the magnets against centrifugal forces. The magnet array 60 may be a cylindrical Halbach array, comprising alternatingly oriented main magnets 61, 62 and pusher magnets 63 between the main magnets (as shown in the detail Figure).

As with the example shown in FIG. 4, the rotor 2 in FIG. 5 comprises a sensor assembly 8—for measuring the rotor position. In the example shown, one cap 30 is carrying a sensoric pattern or structure 81 in the overhang 53 formed between the cap 30 and the rotor drum 50. The sensoric pattern or structure 81 is arranged to induce a sensor signal in the position sensor 82 in the event of rotation of the rotor 2. The sensor signal is used to control the activation of the stator winding 7 in case of motor operation. In the example shown the sensor pattern or structure 81 comprises bipolar magnets arranged in a circular orientation and a group of hall sensors, in order to gain a very high angular resolution of the rotor position measurement.

The magnet array 61, 62, 63 may be mounted by adhesive forces only (not shown) or mounted with adhesive material and fixed by a circumferential magnet cover 65 which may be a wrapping or winding layer. When the rotor 2 is spinning about the rotation axis in use, the wrapping or winding layer at least partially counters the centrifugal forces acting on the permanent magnets 60. Alternatively, the magnet array 60 may be mounted inside of the drum part 50 (not shown, see FIG. 10 and FIG. 11) where the rotor drum 50 may act to counter the centrifugal forces acting on the permanent magnets 60.

FIG. 6 shows another example rotor 2. Like the example shown in FIG. 3, in the example shown in FIG. 6, the rotor 30 comprises D-shaped apertures 35 without material or with substantially much thinner wall thickness. Spoke regions 36 between the apertures 35 may be designed out of plane (from the rest of the cap 30) or out of conus in order to get a ventilation effect during rotation (for example to entrain fluid into or out of the cavity formed by the rotor drum 50 and the caps 30).

Figure 7:
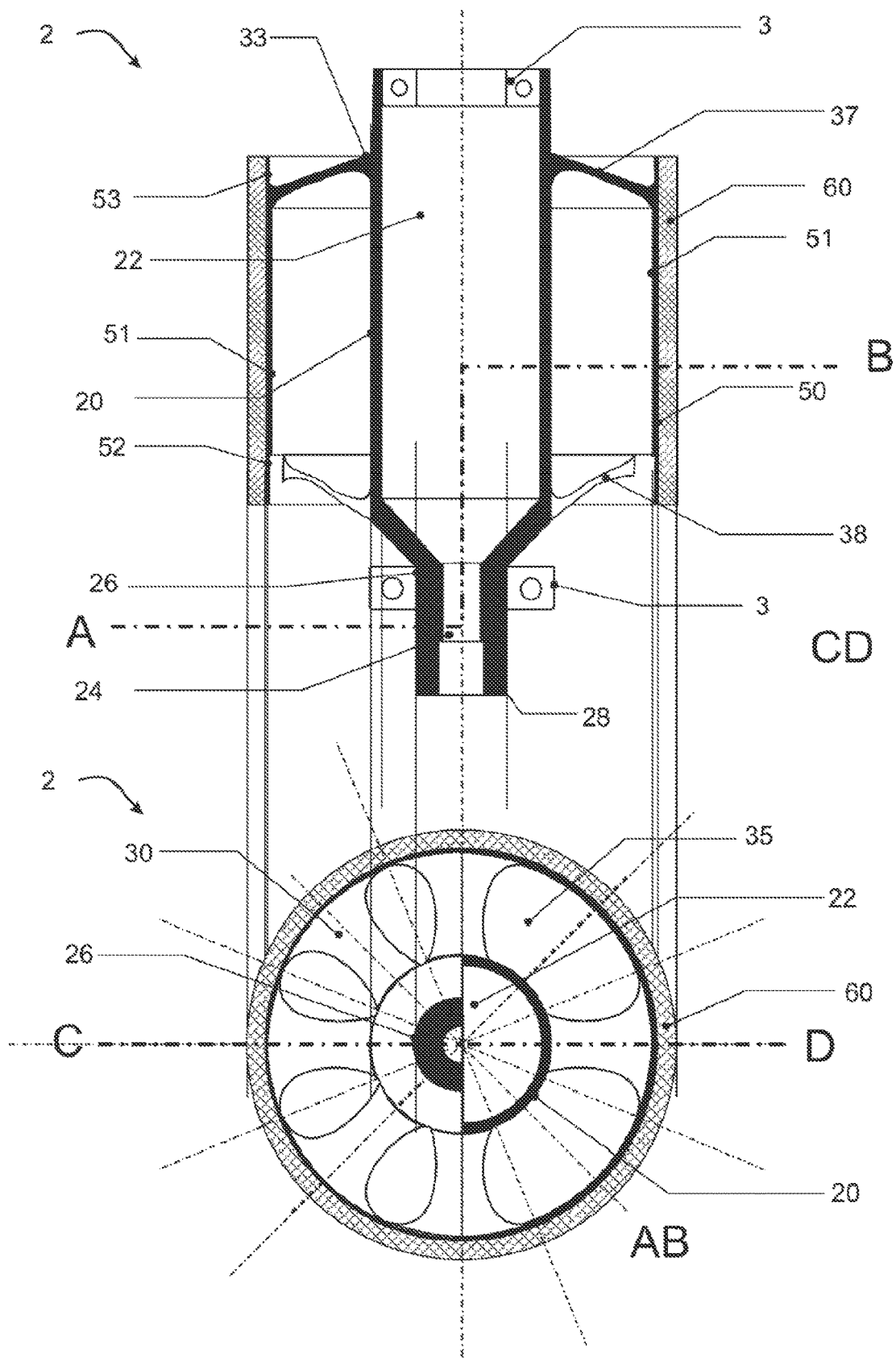
FIG. 7 shows a hollow cap rotor comprising two cap parts which is designed as a spoke cap with wide openings to allow manufacturing by simple moulding.

FIG. 7 shows another example rotor 2 which in this example has a "one-piece" design which may be manufactured for example by casting with a simple casting tool. Casting may be facilitated due to the design of the caps 30. The first cap 37 and the second cap 38 are similar in design but have different orientations on the rotor hub 20 (i.e. so that one is twisted on the hub 20 relative to the other). Although the caps 30 shown in FIG. 7 have a conical design, it will be understood that this is optional. The preferred design for casting or milling as a one-piece-rotor 2 is characterized by a twisting angle between the two caps 37 and 38. The caps 30 comprise apertures 35 and a moulding or milling tool can penetrate the caps 30 through the respective apertures 35 reach through into the cavity between the caps 30. Due to the different orientations of the caps 30 on the rotor hub 20, a moulding or milling tool can access areas inside the cavity due to the relative offsets between the apertures 35 of one cap 30 and the apertures 35 of another cap 30.

In some examples the rotor 2 may only comprise one cap 30. FIG. 8 shows another example rotor 2 with only one cap 30 combined with a rotor drum 50 and a shaft 20. The space or cavity inside of the rotor drum 50 is at least partially filled with a spongious low density material 40. This low-density part material be a foam material such as foamed aluminium or a printed structure or any type of material which is lightweight but stable to centre the rotor drum 50 and to ensure circular precision during rotation. The material is non ferritic and not ferromagnetic and it follows the rotation of the rotor 2 because it is connected to the drum 50 and to the shat 20.

The low-density material 40 may replace one or even all caps 30. In a preferred design the cap 30 has no holes or apertures 35. The low density material 40 may be pushed into the opening between the rotor drum 50 and the hub 20 and/or it may be created inside of this opening and/or the rotor drum 50 may be mounted afterwards onto the low density material 40 with the low density material 40 acting as a support.

Figure 9:
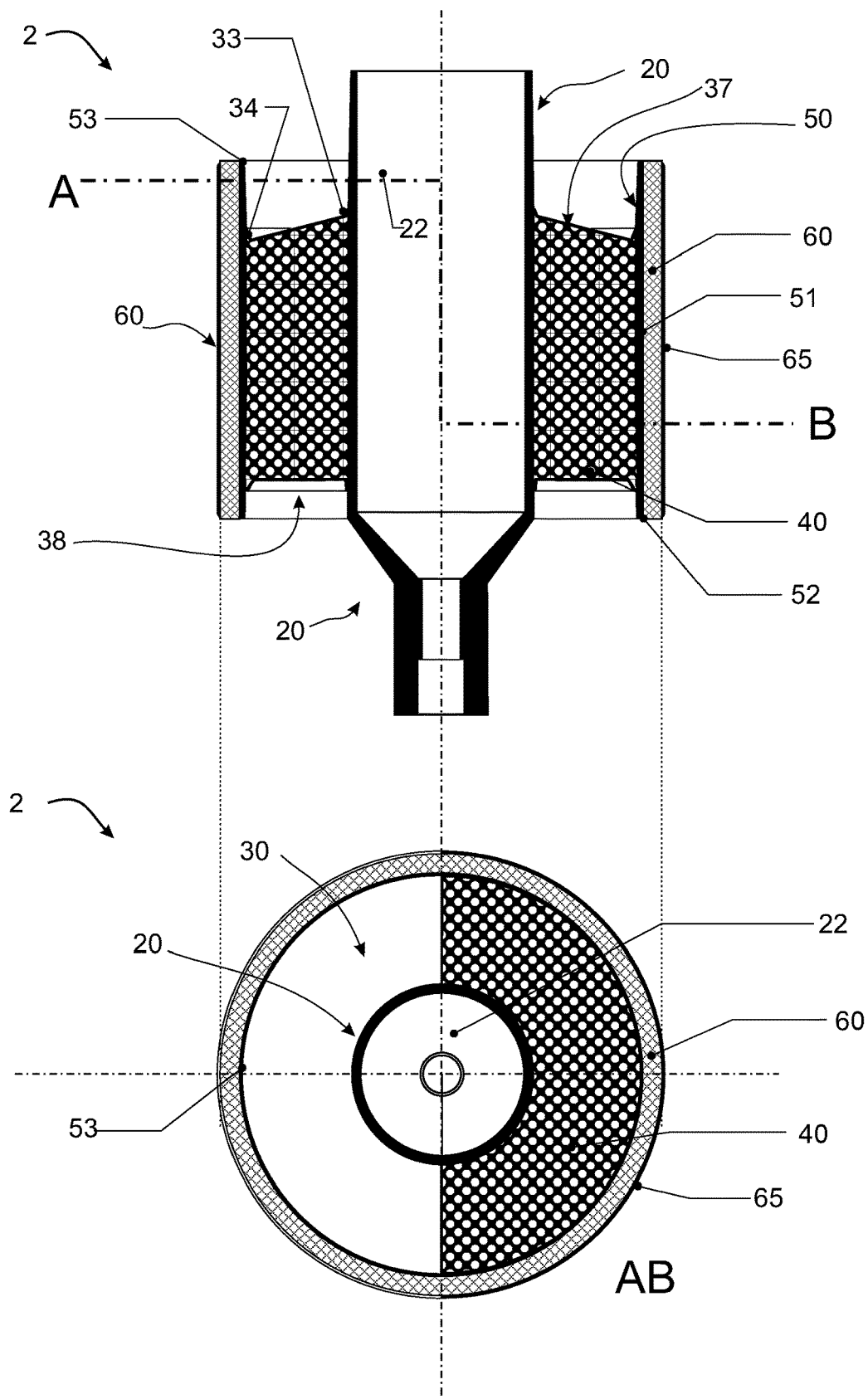
FIG. 9 shows a fibre reinforced drum part which carries a Halbach magnet array outside which is covered by a layer of fibre reinforced material and which is attached to the shaft part by cap parts which contain a spongious material.

FIG. 9 shows another example rotor comprising two caps 37, 38 and comprising a low density filler material 40 which is filling a major part of the volume between the rotor drum 50, the caps 37, 38 and the hub 20. The filling of this volume not only increases stability, it allows to mount very thin-walled caps 30 and very thin-walled drums 50.

In the example shown only one of the caps 30 (the first cap 37) has a frustoconical shape while the other cap (the second cap 38) is flat forming a flat disc around the hub 20. In the example shown the hollow hub 20 has a two-step diameter—the diameter of the hollow hub part 20 is larger in the axial position of the rotor drum 50 and smaller proximal to the bearing 3. This design can be used, for example, for composite hub parts with fibre reinforcement and for cooling purposes.

In preferred examples this two-step diameter hub 20 may be used as a part of a cooling system in order to transfer cooling liquid through inside of the hollow hub 20.

In preferred examples the magnet array 60 with the cylindrical arrangement of magnets is wrapped by a fibre reinforced cover 65 or with a metal cover 65. Carbon fibre cover parts are even stiffer and stronger than metal cover parts. Metal cover parts are preferably thinner than 0.5 mm.

Figure 10:
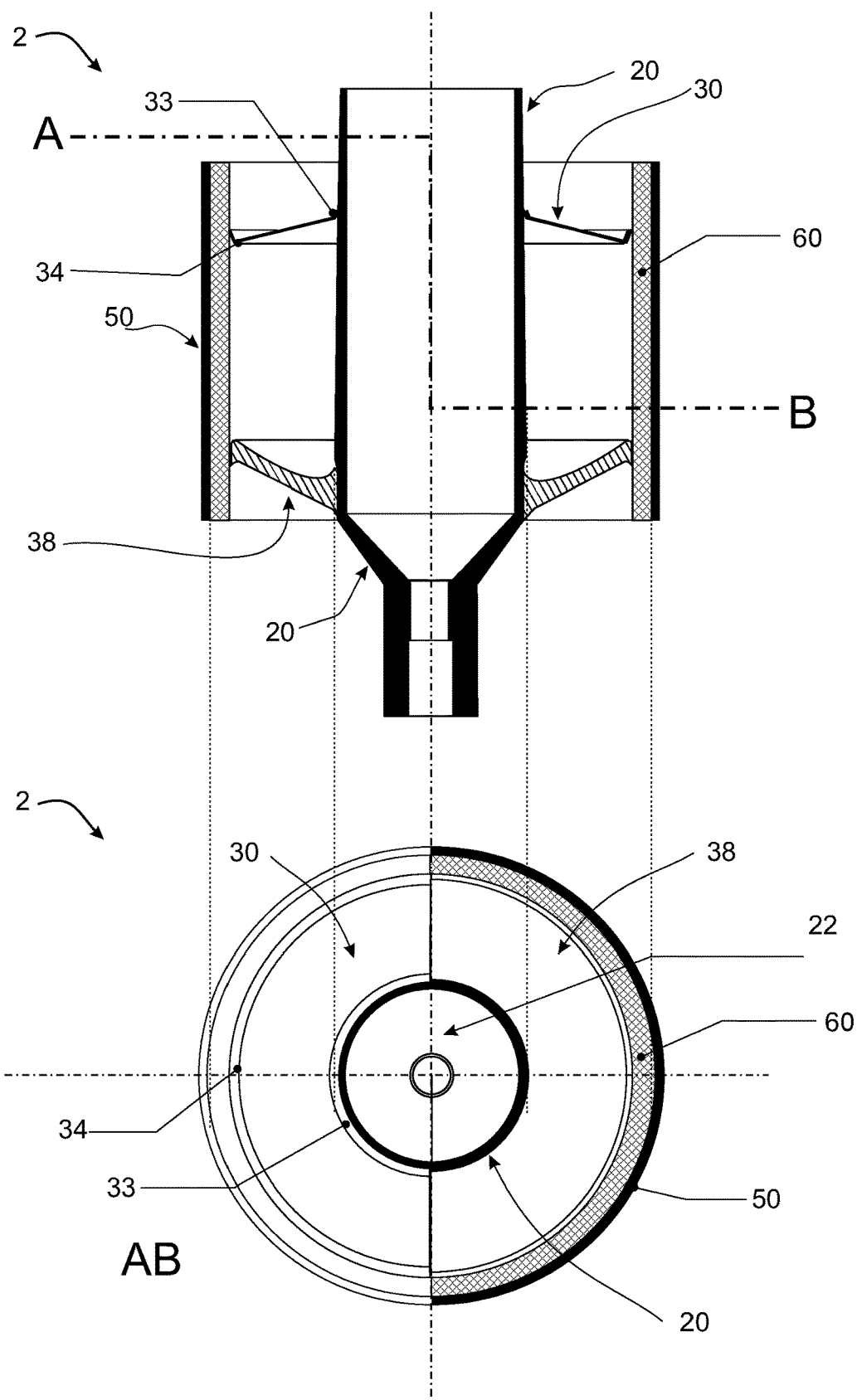
FIG. 10 shows a hollow cap rotor with a magnet array mounted inside of the drum part and the cap part fixing the magnets radially and connecting the drum arrangement with the shaft part.

As described above, in some examples the magnet array 60 may be located inside the rotor hub 50, such that the rotor hub 50 can act to counter any centrifugal forces on the magnet array 60 in use. FIG. 10 shows an example of such a rotor 2 with the magnet array 60 inside of the rotor drum 50. In this example the caps 30 are used to fix the magnet array 60 relative to the rotor drum 50 and to make them stay in this position even under high load and high rotation speed (for example the caps may inhibit or prevent movement of the magnet array 60 in the longitudinal or rotation axis of the rotor 2). Adhesive materials may be used to support the fixation of the magnet array 60 to the rotor hub 50 and/or to the caps 30. Since the magnets 61, 62, 63 are surrounded by the rotor drum 50, no additional magnet cover 65 or liner is necessary. Since the rotor drum 50 is preferable made from a material that is not ferromagnetic, like austenitic stainless steel of fibre reinforced composite, the rotor drum 50 now is part of the magnetic air gap between magnet array 60 and outer flux ring 8 (not shown). Especially in the case of using a Halbach array the magnetic field is pushed mainly outwards radially and only little magnetic field is inside of the rotor drum 50 and inside of the magnet array 60.

Figure 11:
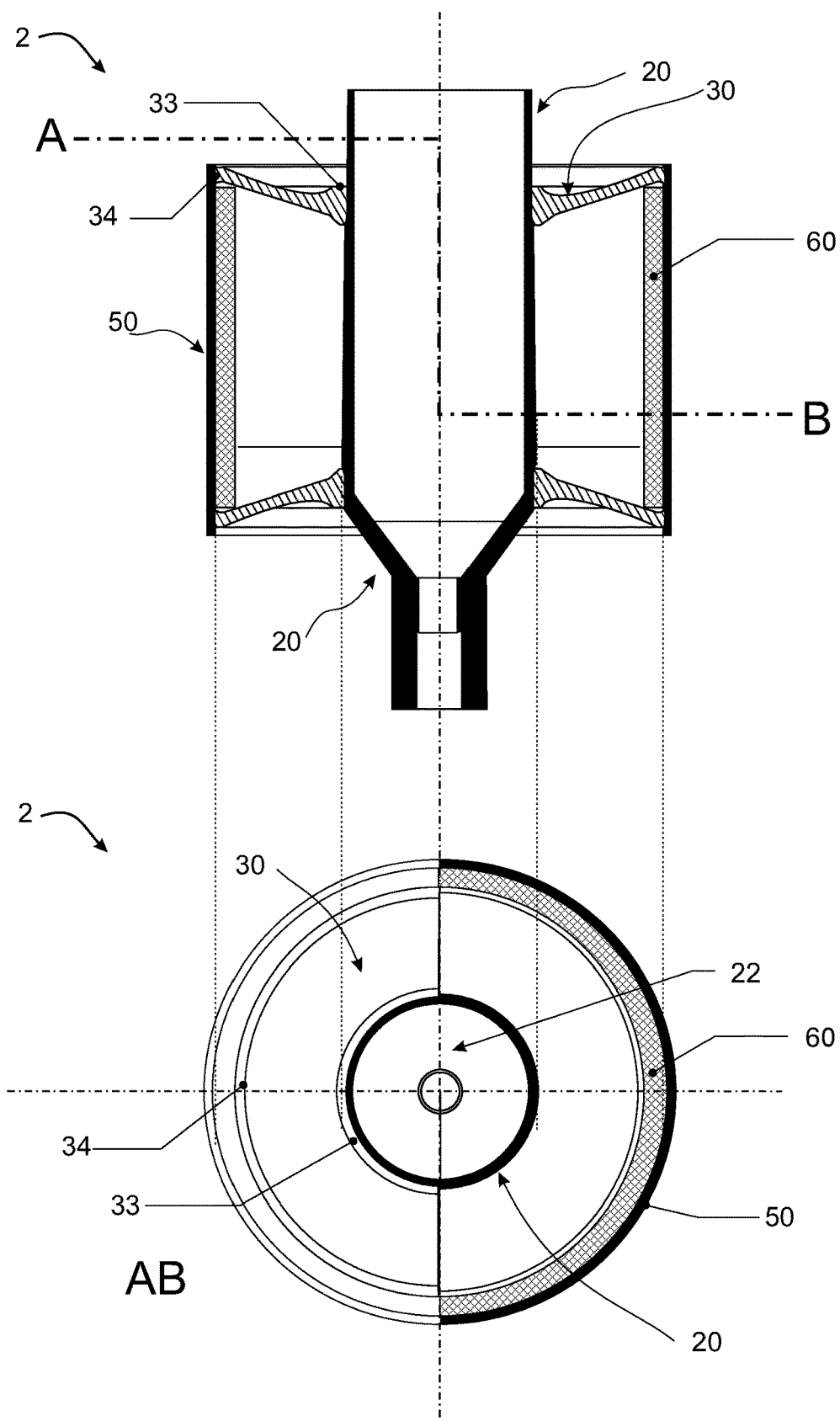
FIG. 11 shows a hollow cap rotor with a magnet array mounted inside of the drum part and the cap part fixing the magnets axially and connecting the drum arrangement with the shaft part.

FIG. 11 shows another example of a rotor 2 with the magnet array mounted inside of the rotor drum 50, but in this embodiment both caps 30 form frustoconical discs and both caps 30 connect directly to the rotor drum 50. FIG. 11 also shows how the caps 30 may splay in opposite directions such that the connection area 33 of the caps 30 with the hub 20 are closer to each other in the longitudinal or rotation axis than the connection area 34 of the caps 30 with the rotor drum 50.

In the example shown in FIG. 11, the magnet array 60 is positioned axially by the caps 30 but not radially, such that the caps 30 bound the magnetic array 60 along the longitudinal or rotation axis. This example makes the rotor drum 50 longer than the magnet array 60 and longer than the active winding in the longitudinal or rotation axis, and also longer than the outer flux ring (all not shown). Nevertheless, the advantage of this example is that the magnets may be fixed precisely and safely inside of the mechanically stable rotor drum 50. In addition, the magnet array 60 can be protected from humidity and aggressive substances as soon as the caps 30 are tight and sealed. Consequently, an additional magnet cover 65 may be not needed.

In case of connected caps 30 and shafts 20 the inner axial position 33 is the mechanical center of the fusion area of cap 30 and shaft 20 and the outer axial position 34 is the fusion area of the cap 30 and the drum 50. This combination results in a very short shaft 20 and allows compact low weight designs.

FIGS. 12a and 12b show different arrangements of caps 30 on a hub 20. The caps 30 preferably have a conical design with conus angles 31 and 39 which may be different or may be the same. Also, as shown in FIGS. 12a and 12b the diameters inside and outside of the caps 30 may be different such that each cap 30 may extend to a different radial extent. The axial orientation of the caps 30 may be the same as shown in FIG. 12b or different (for example, symmetrical about a plane transverse to the longitudinal or rotation axis) as shown in FIG. 12a.

Figure 12:
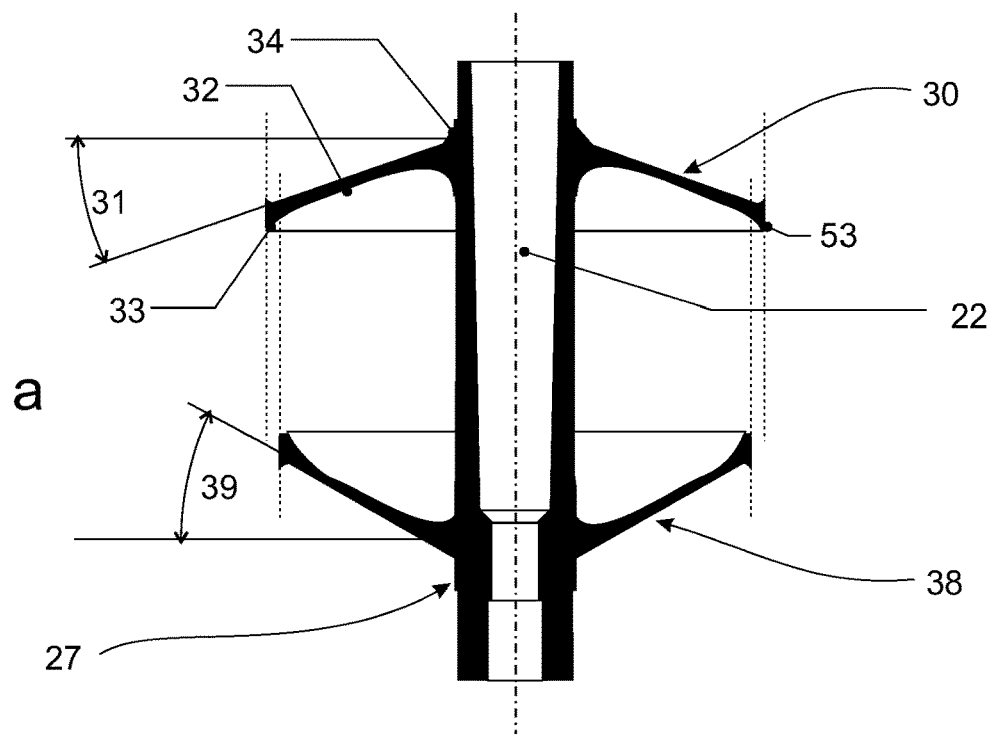
FIG. 12 shows a variation of cap parts on a shaft parts.
Figure 12:
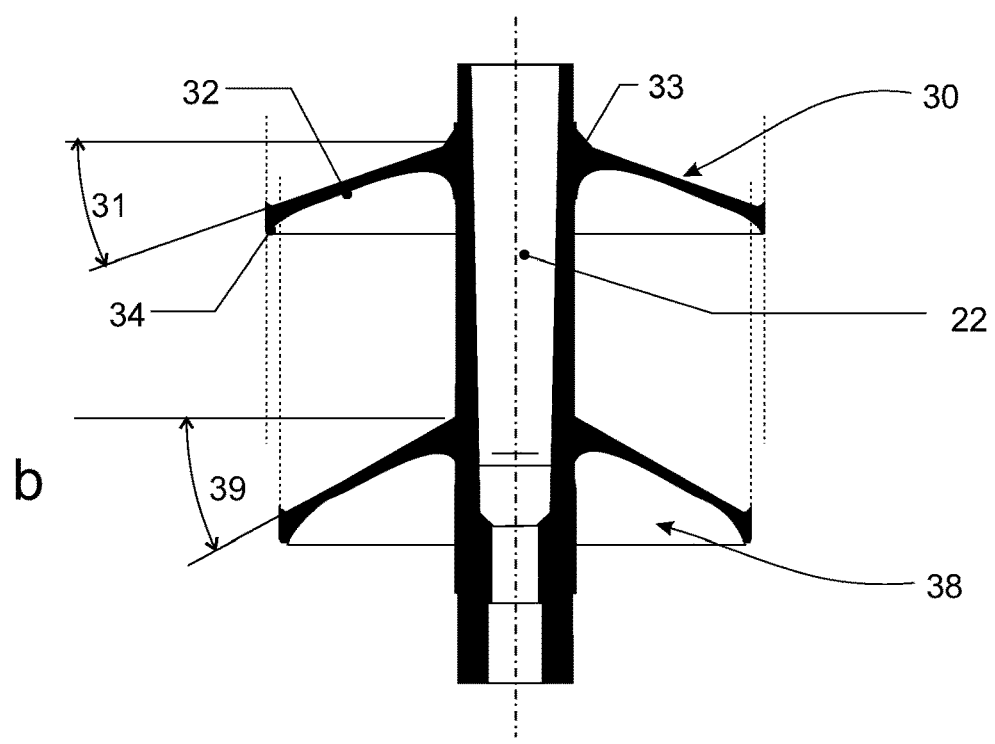

FIG. 12 *a*) shows an example with two end caps 30 and 38. First end cap 30 has a positive axial position difference (along the longitudinal or rotation axis). Second end cap 38 has a negative axial position difference (along the longitudinal or rotation axis) and in this example has a smaller radial extent to first end cap 30. This may be used for drums which have different inner drum radiuses.

FIG. 12 *b*) shows a different example with two end caps 30 and 38. Here the second end cap 38 is at a different angle relative to the shaft 20 than the first end cap 30.

Figure 13:
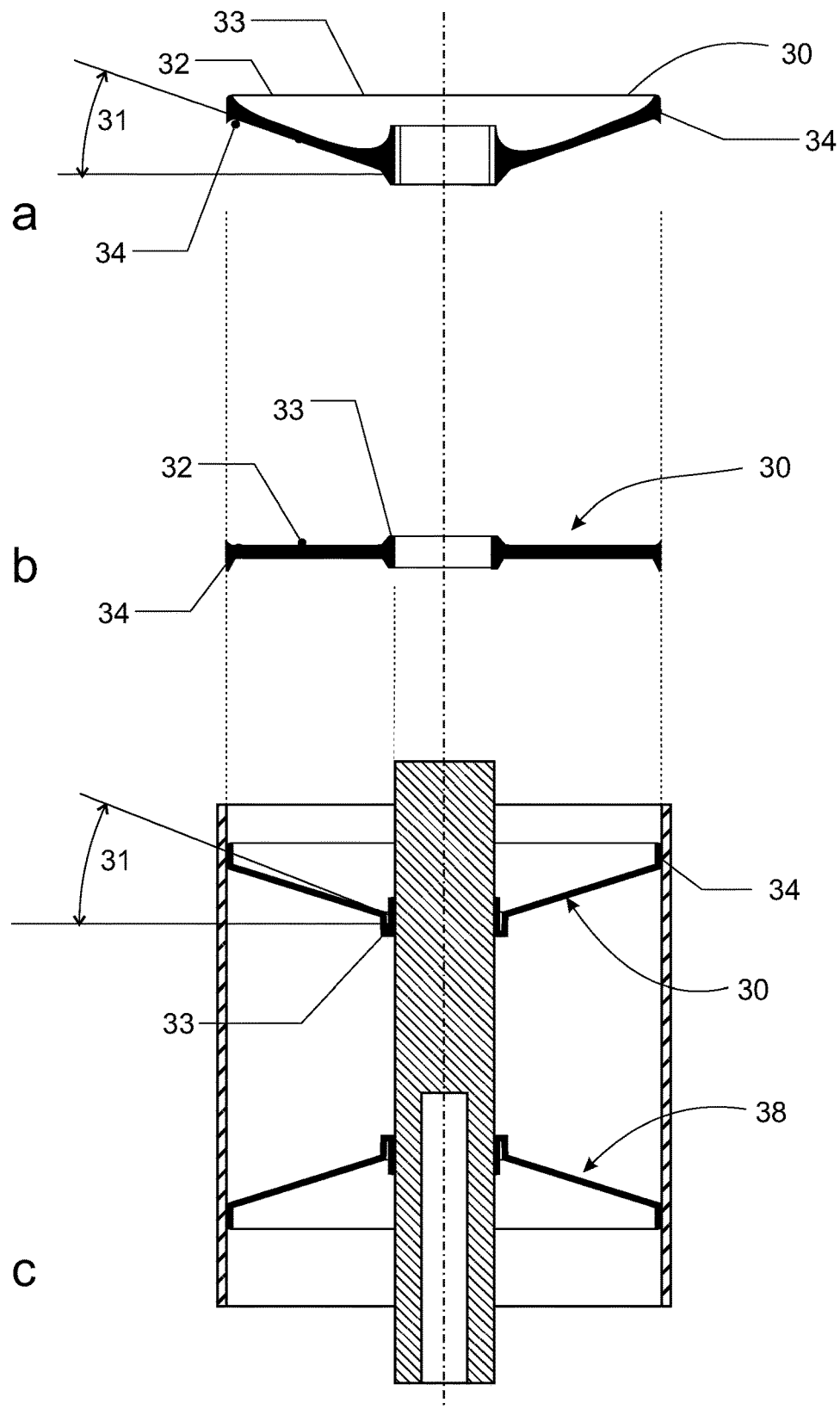
FIG. 13 shows a variation of cap part designs.

FIGS. 13a, 13b and 13c show different designs of example caps 30 which may be used in example rotors 2 of the disclosure.

In FIG. 13a, a preferred design of a cap 30 comprises a geometry with a conical or frustoconical disc shape and shows an end cap 30 with a positive difference between outer and inner axial positions (along the longitudinal or rotation axis). This frustoconical disc shape achieves high stability against micromovements. Compared to a flat cap 30 design, the conical/frustoconical structure is much stiffer. Such end caps may be made of stiff materials such as metal or carbon reinforced materials. They are designed for fixation on a shaft. The stiffness of the cap 30 is important especially for the mounting and fixing procedure. While in this example the cap 30 is straight to provide the conical or frustoconical disc shape, it will be appreciated that in other examples the cap 30 may be curved or cup-shaped to provide a similar shape, for example a parabolic or hyperbolic shape or a pseudospherical (or horn) shape.

In FIG. 13b, a cap 30 having a flat disc-like geometry (i.e., perpendicular to the shaft 20) is shown with only little or no difference in axial position (along the longitudinal or rotation axis). The cap 30 in this example may be at least partially elastic. However, the precision of the position of the cap 30 relative to the hub 20 would be less good.

In FIG. 13c, two caps 30 are shown that are made from sheet metal which is formed by a pressure moulding process. The wall thicknesses of the caps 30 may be very thin, below 1 mm, as long as the connection areas 33 and 34 between the caps 30 and the hub 20 are designed for safe and stable mounting. Different designs, diameters and conus angles may be used for the caps 30 in order to allow an easy mounting on the hub 20. FIG. 13c shows a combination of a shaft, two end caps 30, 38 in a mirrored configuration and a drum 50 with an outer drum surface 50 and an inner drum surface 51 which has the radius R.51. FIG. 13c shows an ideal situation in total symmetry and a very light weight design with thin material walls. The use of two end caps 30, 38 results in very high stability. As a result of the high degree of stabilization provided by the two end caps 30, 38, and centricity, the wall thickness of the drum tube 50 could be reduced to for example 1 to 4 mm. These end cap 30, 38 designs may alternatively be fused with a shaft 20 or a drum 50 or both.

Further examples of the present disclosure will now be described with reference to FIGS. 14a and 14b.

Figure 14A:
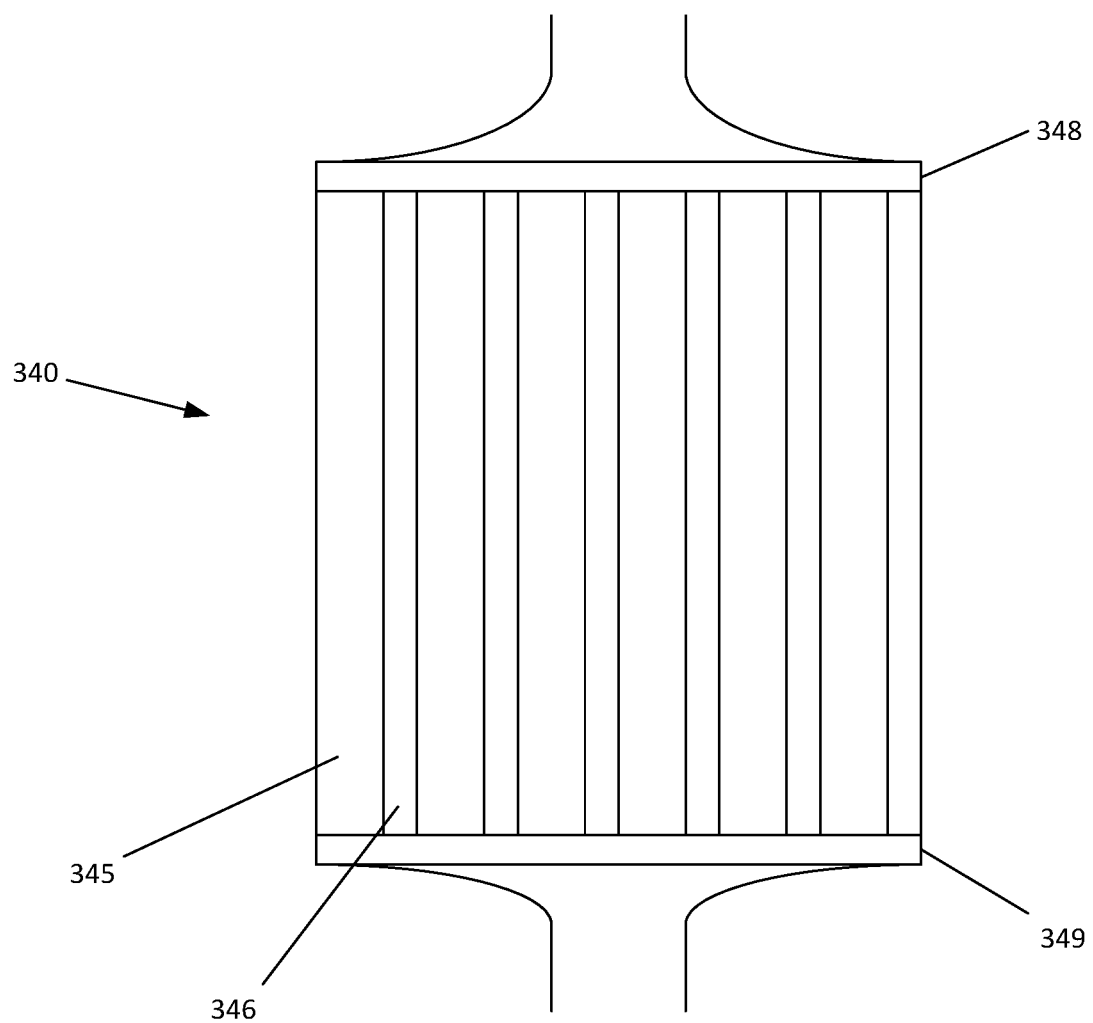
FIGS. 14a and 14b show an exemplary magnetic array for a rotor.
Figure 14B:
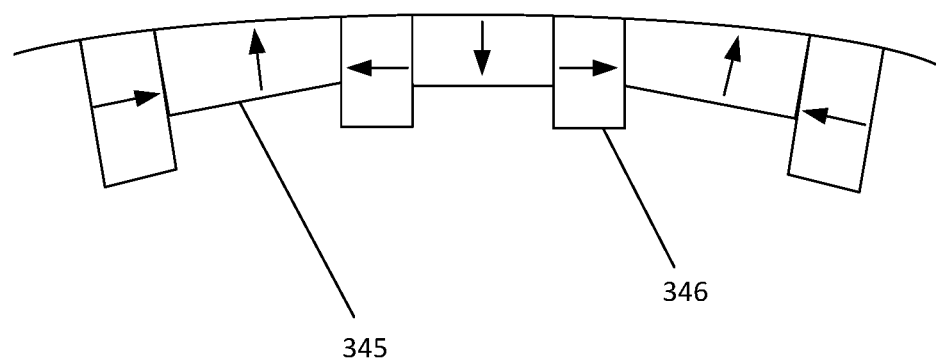

FIGS. 14a and 14b show an exemplary magnetic array 340 for a rotor 2, such as the rotor shown in any of FIGS. 1 to 13. The rotor shown in FIG. 14a includes a top end cap 348 and a bottom end cap 349. The magnetic array 340 comprises a plurality of main magnets 345 and a plurality of pusher magnets 346.

The magnetic array 340 may be arranged to provide a Halbach array. The plurality of magnets may cover the circumference of the rotor drum 50. Each magnet of the array 340 may cover a selected portion of the circumference of the drum 50, e.g. each magnet will cover the longitudinal extent of the array 340 for a region of the circumference. Moving around the circumference, the main magnets 345 alternate with the pusher magnet (e.g. so that subsequent main magnets 345 are separated by a pusher magnet, and each main magnet has pusher magnets 346 on either side of it). The main magnets 345 are arranged to provide a series of alternating polarities. Each subsequent main magnet will have an opposite polarity to its preceding main magnet (when traversing around the circumference of the array 340). The pusher magnets 346 are arranged to have a polarity transverse to the alternating polarity of the main magnets 345. Each subsequent pusher magnet will have an opposite polarity to its preceding pusher magnet.

The magnets of the Halbach array may be of different shape and/or size. The magnets may be arranged so that at the outer radial surface the array 340, the magnets lie flush with one another, e.g. so that the outer surface of the magnet array 340 is consistent (at a constant radius). As shown in FIGS. 3a and 3b, the pusher magnets 346 may be narrower than the main magnets 345. That is, each pusher magnet may extend around a smaller portion of the circumference than each main magnet. The pusher magnets 346 may be deeper than the main magnets 345. That is, the pusher magnets 346 may extend along a greater radial length than the main magnets 345. There may be a selected number of magnets around the array 340. The total number of magnets (pusher and main) may be e.g. 8, 16, 32, 64, etc.

The rotor drum 50 may be arranged to have an outer surface which corresponds to the intended magnetic array 340. For example, the rotor drum 50 may have a series of alternating protrusions. Each protrusion of the outer surface of the rotor drum may be selected for a particular magnet (pusher or main). Each protrusion may have a corresponding width and depth selected based on the magnet it is intended to receive. The width and depth may be selected so that the protrusion can receive a magnet of the intended width, and that when a magnet is inserted to the protrusion, the radial extent of the magnet is at a selected radius (e.g. so that each magnet's outer radial surface is at the same radius).

The array of magnets 340 may be arranged to provide a strong magnetic field on one side of the magnets, but a much weaker magnetic field on the other side. For example, the Halbach array may be used to provide this functionality. The magnet array 340 of the rotor drum may be arranged so that the stronger magnetic field side is the radially outward side (e.g. the side in the direction of the windings of the stator). The width and depth of the pusher and main magnets 345 may be selected to provide a further one-sided magnetic field distribution. That is, the magnets of the magnet array 340 may be arranged to inhibit the magnetic field transmitting into the inner radial components of the rotor (e.g. where it may interfere with other components such as the indicator and/or rotation of the rotor). For example, FIG. 14b shows arrows which indicate the direction of the magnetisation vectors for each of the magnets of the array 340. This arrangement may provide a Halbach array with a stronger magnetic field on the outer radial side of the magnetic array 340/rotor drum and a weaker magnetic field on the inner radial side.

Also shown in FIG. 14a are end caps for the rotor 2. End caps may be provided to cover (e.g. seal) the top and/or bottom of the rotor drum. End caps may be coupled to the rotor drum and/or the hub (e.g. via a bearing interface) to permit relative rotation therebetween. One or both end caps may be configured to remain stationary while the rotor 2 rotates. The end caps may comprise one or more sensors. For example, the end cap may have a plurality of sensors arranged in a circle on in the end cap. The sensors may be configured to detect the rotor position indicator (e.g. the sensors may be hall effect sensors). The sensors may be configured to work together to provide a plurality of measurements of magnetic field (e.g. to identify the rotational position of the rotor based on the changing magnetic field brought about by movement of the indicator).

It is to be appreciated in the context of the present disclosure that the examples shown in the figures are examples which are not to be considered limiting. For example, the combinations shown in the different FIGS. are to illustrate exemplary components for the rotor 2. These components may be provided in the combinations shown, or they may be provided in different combinations. For example, embodiments of the present disclosure may comprise a top and/or bottom end cap, or no end cap at all. In some examples the caps 30 may provide the functionality of the end caps. Embodiments may utilise internal and/or external sensing for position of the rotor 2 (e.g. sensors may be provided which are nested within the rotor drum 50, or sensors may be provided which are outside the rotor drum 50 but may still detect movement of the rotor drum 50). For example, a separate sensor arrangement may be provided which uses a position indicator connected to the hub 20 instead of on or in one of the caps 30. It is to be appreciated that the specific type of sensor/indicator combination is not to be considered limiting. Indicators may provide be detected based on a resulting magnetic field, or lack thereof, which they provide (e.g. indicators may be magnetic, or they may be the absence of a magnetic material). In examples, position sensing may not use hall sensors, and instead may utilise other detection means such as ultrasound/infrared detection and/or induction sensing may be used.

Embodiments of the present disclosure may utilise a Halbach array for the array of magnets 60. Alternatively, different arrangements of magnets may be used. Magnets in the array 60 may be of the same size and/or shape or they may be different. Magnets in the array 60 may be held in place by a liner (such as a steel liner) or they may be affixed to the rotor drum 50 using other means (e.g. adhesive or fixation means for retaining them in place). Hubs 20 disclosed herein may utilise one or more bearing arrangements 3 to facilitate relative rotation between the hub and other components. For example, on one or both sides of the rotor drum the hub may have a bearing interface for interaction of the hub with other components.

It is to be appreciated in the context of the present disclosure that rotors 2 described herein may be configured to enable rotational motion to be transmitted to a central shaft by applying a torque to drive rotation of a magnetic array of the rotor 2. Embodiments may comprise one or more components configured to transmit the rotation from the magnets to the hub 20 and optionally from the hub 20 to a shaft 26 (e.g. via an interference fit). Rotors described herein may comprise a rotor drum 50 for supporting the array of magnets 60 and may be arranged to couple said rotor drum 50 to a said shaft 26 to facilitate transmission of rotation from the drum 50 to the shaft 26. To facilitate this transmission of rotation, one or more caps 30 may couple (directly or indirectly) the drum 50 to the shaft 26. Hubs 20 described herein may be used to provide coupling of the caps 30 to the shaft (e.g. via an interference fit). It will be appreciated in the context of the present disclosure that the hub 50 and the caps 30 may be formed by a single component, e.g. so that the hub 20 represents and inner portion of said component and the caps 30 represent outer portions for coupling to the rotor drum 50. The drum 50 may also be part of this single component (or the drum 50 and caps 30 may be a single component). Embodiments of the present disclosure may utilise one or more foamed materials, such as providing one or more of the hub 20, drum 50 and/or caps 30 by a foamed materials, e.g. foamed aluminium.

It is to be appreciated that the hub 20 and caps and/or the caps 30 and drum 50 may have engagement surfaces for engagement therebetween (e.g. the engagement surfaces may comprise contact zones where the two components are joined). Said engagement surfaces may be shaped to facilitate transmission of rotation therebetween. For example, an inner region of the drum 50 may have a first shape, and the outer region of the caps 30 may have a shape corresponding to the first shape so that, when the caps 30 are inserted radially within the drum 50, the two surfaces match to secure the two components together and to enable rotation of one to rotate the other. For example, said shapes may include one or more angular sections (e.g. they may not be circular), such as by providing a star-type shape (e.g. with a number of corresponding protrusions and recesses which lock together for engagement therebetween. A portion of the rotor drum 50 may form an inner flux ring. For example, a region (or all) of the drum 50 may be of a suitable material to provide inner flux ring functionality.

It will be appreciated in the context of the present disclosure that one or more rotor position indicators 81 and/or rotor position sensors 82 may be provided. Multiple indicators and/or sensors may enable greater precision and/or reliability in determining the position of the rotor 2. The number of indicators may correspond to (e.g. be the same as) the number of sensors. The arrangement of sensors may also correspond to the arrangement of indicators.

It will be appreciated in the context of the present disclosure that while reference is made to rotors 2, the present disclosure provides components which may be mounted onto a shaft to provide a rotor (e.g. embodiments may provide conversion kits which may be coupled to a shaft, and said component placed in a stator to provide a rotor).

In some examples the entire rotor 2 may be made from a fibre reinforced composite structure. In these examples the rotor drum 50 may be reinforced by fibre structures which form a cylinder. A multitude of fibres may be woven or connected with the fibre structure of the rotor drum 50 and also connected with a fibre structure of the cap(s) 30. The hub 20 may also comprise a fibre structure with a multitude of fibres connecting the hub 20 and each cap 30. The reinforcing fibres may have high tensile strength and together with a polymer matrix they build a fibre reinforced composite structure. The fibre arrangement may be arranged manually or with the help of prepregs or with the help of a fibre layer creating robot. Such fibre reinforced rotors 2 may achieve maximum stability al lowest weight. A multitude of fibres or a long fibre may also surround the magnet array 60 and keep the magnets in place precisely even at very high rotational speed of the rotor.

It will be understood that in many examples the rotor drum 50 is a thin-walled cylindrical drum. This drum may be is directly connected with the caps 30 and in turn the hub 20. The connection may be a weld, or a press fit or a shrink fit, or the rotor 2 may be manufactured as a single part for example by casting or additive or subtractive manufacturing.

The rotor drum 50 comprises a mostly cylindrical element with a thin wall thickness preferably below 10% of the drum radius, most preferably below 5% of the drum radius, in extreme lightweight design below 1.5 mm or even below 1.0 mm wall thickness.

The rotor drum 50 may have an even thinner wall thickness at the axial ends of the drum 50. The outer diameter is preferably the same, but the inner diameter of the drum 50 in these regions may be preferably larger at the axial ends than deeper to the axial centre of the drum 50. This has advantages for the durability of the bonding fixation to the magnet array 60.

The rotor drum 50 may also have areas or regions designed for connection to the caps 30. In a preferred example there is a recess in diameter which works like a stopper ring for a disc part. In another preferred embodiment the connection area 34 is connected as one solid part of the drum 50 with the cap 30.

The rotor drum 50 may be made from high tensile strength like steel or carbon composite. Preferably the drum material has medium or low electrical conductivity compared to iron, like austenitic stainless steel which has less than 10 percent or even less than 3% of the conductivity of aluminium.

The caps 30 have an outer diameter connecting to the diameter of the rotor drum 50 and an inner diameter connecting to the outer diameter of the hub 20. The caps 30 are preferably thin walled with medium wall thickness than 10% of the axial length of the drum 50, preferably less than 5% of the drum length.

The caps 30 preferably have a conical design with an inclination angle between 3 and 30 degrees. But in some simple cases the caps 30 may be partially flat. Flat caps 30 may be preferred from a cost perspective but it has to be taken into account that this may result in less stability or more weight. The cap 30 design need not be conical, and instead other shapes may be used. For example, the inner and outer regions of the cap 30 may be axially offset from each other. As the cap 30 extends radially outward, its axial position may not change uniformly, e.g. the rate of axial displacement may vary with increased radial extension.

The average wall thickness of the caps 30 is preferably thinner than 10% of the radius, preferably thinner than 5% of the radius, in very lightweight versions thinner than 3% of the radius. The preferred conical cap disc design uses a kind of mirror symmetry in the cap discs to stabilize the drum 50 against axial and radial movements relative to the hub 20 effectively.

In a highly preferred embodiment, the caps 30 have a conical design with a conical angle less than thirty degrees or more flat less than 20 degrees off flatness. The conical disc design increases stability especially in the preferred embodiment with two conical caps 30 in symmetrical or at least counter orientation.

In examples the rotor 2 may be used in a motor or a generator, as shown in FIG. 1 as described above. In such examples there will be an air gap 9. The magnetic air gap is located between the highly permeable outer flux ring 8 and the cylindrical magnet array 60 on the rotor 2. The magnetic air gap is not free of any solid material because there may be the metal liner surrounding the magnet array 60. Then there is a thin layer of air surrounding that liner. Then a thin layer of epoxy may follow, like a coating inside of the cylindrical opening on the stator winding 7. Then more radially outwards the conductive winding 7 is located. The conductive layer of the winding 7 comprises conductive areas and insulating areas. The conductive areas may be copper wire filaments. Solid wires may be used as wall even if they suffer severe eddy losses at high frequencies.

The radial thickness of the conductive winding 7 may be smaller or larger than the radial thickness of the magnet array 60. A wide magnetic air gap may be designed to get a thick layer of copper winding which may be between 1 and 10 mm thick in the radial direction, preferably between 2 and 6 mm thick. Since Halbach arrays may be used the magnetic field may penetrate even wider gaps. A preferred cylindrical Halbach array is pushing the magnetic field outwards and creates only a low magnetic field inside of the rotor drum 50

The material air gap or free air gap 9 between the rotor 2 and the stator allows the rotational movement without friction and without risk of damage. The free air gap 9 is much narrower than the magnetic air gap. The free air gap 9 is mostly equidistant, and the gap distance is preferably below one thousand micrometres, most preferably below six hundred micrometres. Preferably the free air gap is around 1.2% or less than 1.2% of the radius of the rotor 2.

The magnetic air gap is the sum of the real air gap plus the thickness of the liner 65 around the magnets 60 plus the thickness of an inside coating of the stator plus the thickness of the winding 7. Then comes the outer flux ring 8. An inner flux ring may not be existent.

Figure 15:
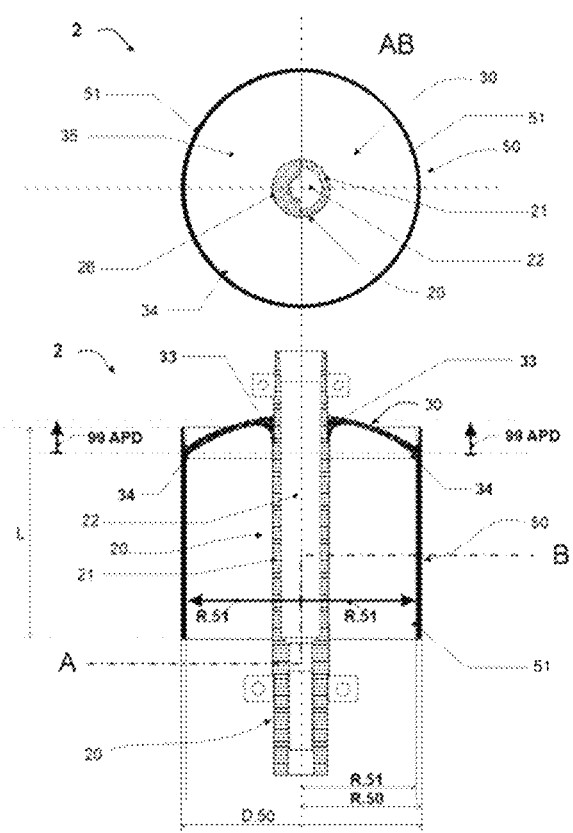
FIG. 15 shows an example rotor with only one end cap part.

FIG. 15 shows a theoretical example of a rotor 2 with only one end cap 30 and a hollow drum 50 and a mainly cylindrical shaft 20. In this example the end cap 30 is curved or cup shaped. The drum 50 looks centered. Drum 20 and disc 30 may be made from the same material and in one piece/integrally formed. The shaft may also be made of the same material and the whole combination may be one piece/integrally formed. Nevertheless, the mechanical stability of this rotor 2 is rather low, because the axial length L of the drum 50 is large. Small angular deviations will result in measurable and maybe destructive deformations of the rotor 2.

It will be appreciated that magnets are not shown in this example, but they may be mounted inside or outside of the drum 50.

The drum 50 has a local inner radius R.51 that is constant all around the 360 degrees. The real radius will be a function of the angular position along the circle and of the axial position on the drum. If the real rotor is not ideal, static and dynamic imbalance will appear.

Figure 16:
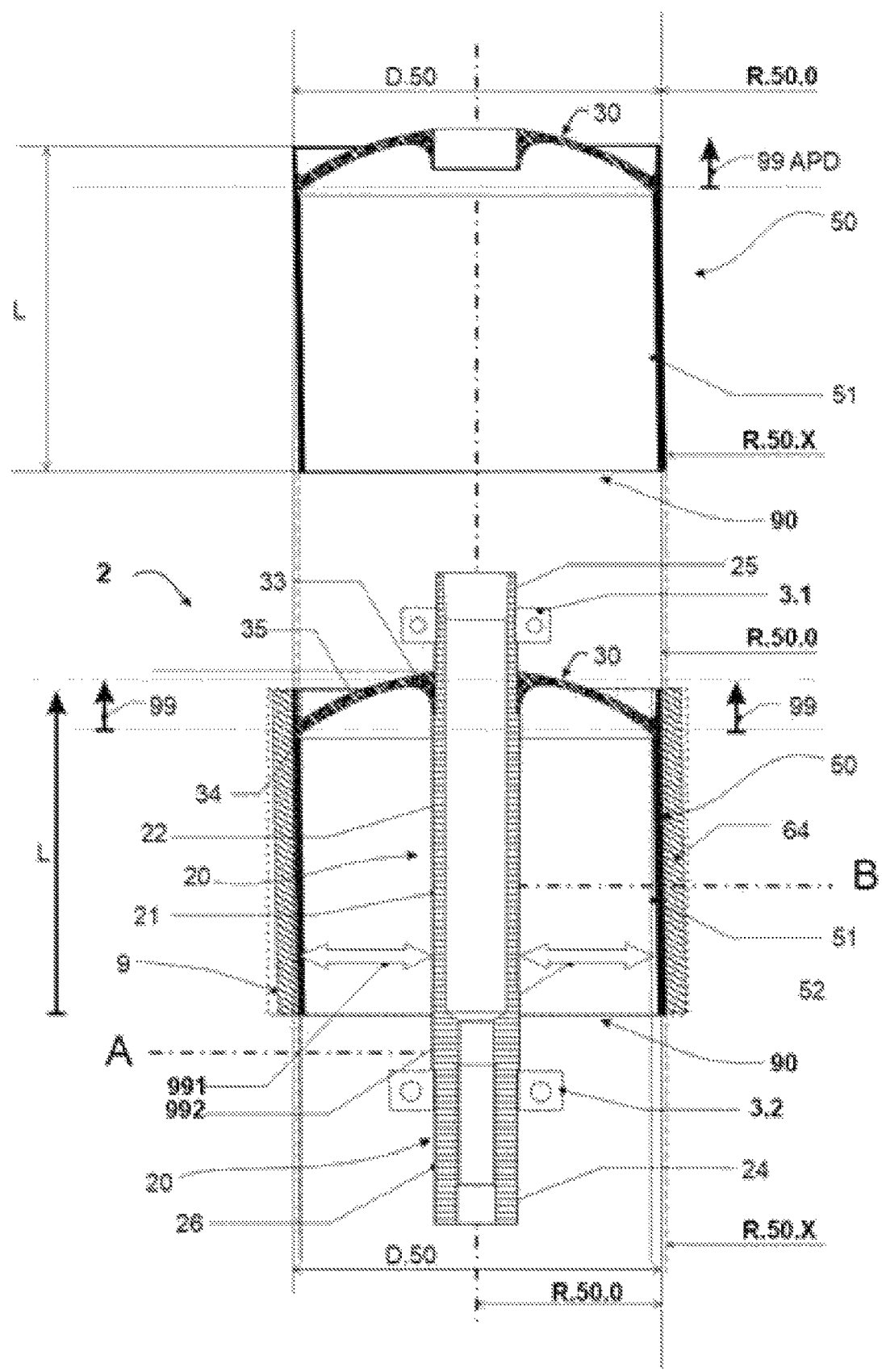
FIG. 16 shows a schematic view of an example rotor after deformation.

FIG. 16 shows a schematic model of a real rotor 2 after deformation. In this example the end cap 30 is also curved or cup shaped. Deformation may occur during production, mounting or use. In the case of lawn mower motors a shock can be caused when the mower blade hits e.g., a stone. Such shocks are frequent during heavy duty operation. Nevertheless, the rotor should be lightweight.

If only one end cap 30 is used, the rotor drum 50 may tilt its axis relatively to the shaft 20 axis. This will result in a large and measurable deviation of the local radius of the rotor especially at the open end without an end cap. The drum 50 and magnets will rotate out of balance and the problem will increase on and on. This is why the simple combination with only one end cap 30 has limited stability and may not be shock-proof enough for heavy duty applications.

For heavy duty applications light weight rotors with two end caps 30, 38 are the preferred embodiments, as described above for example with reference to FIGS. 1-8 and FIGS. 10-13.

Figure 17:
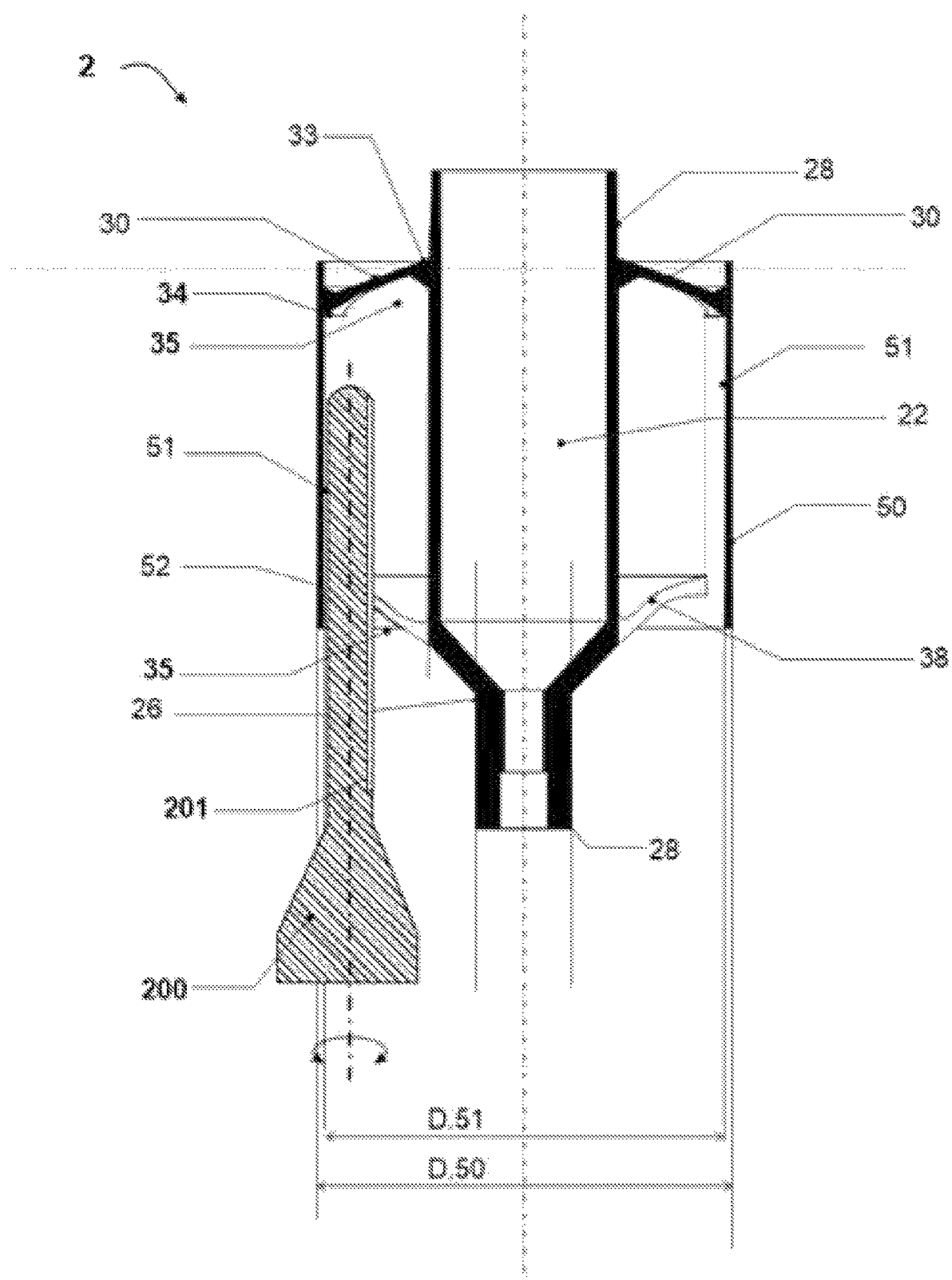
FIG. 17 shows an example rotor with two end cap parts.

FIG. 17 shows a highly developed embodiment with two end caps 30 and 38 which have cut-outs or apertures 35 (for example, similar to those shown in FIG. 3 as described above). Such a design allows manufacturing via casting or even deep forging. Milling may then be performed after manufacture to reduce weight. For example, the milling afterwards may be performed with mechanical tools 200 or a laser, using the open access through the cut-outs or apertures 35 in the end cap.

The two end caps 30 and 38 are kind of mirrored but they show an angular rotation, otherwise it would be hard to have access for the machining tools to the inner part of the rotor 2.

Such designs may also be manufactured via additive manufacturing like metal 3D printing or fiber reinforced 3D printing or 3D sintering. Laser energy or mechanical energy may be used to remove material or to shift or add material in order to achieve a better static and dynamic stability of the rotor 2.

It will be appreciated from the discussion above that the examples shown in the figures are merely exemplary, and include features which may be generalised, removed or replaced as described herein and as set out in the claims. With reference to the drawings in general, it will be appreciated that schematic functional block diagrams are used to indicate functionality of systems and apparatus described herein.

As will be appreciated by the skilled reader in the context of the present disclosure, each of the examples described herein may be implemented in a variety of different ways. Any feature of any aspects of the disclosure may be combined with any of the other aspects of the disclosure. For example, method aspects may be combined with apparatus aspects, and features described with reference to the operation of particular elements of apparatus may be provided in methods which do not use those particular types of apparatus. In addition, each of the features of each of the examples is intended to be separable from the features which it is described in combination with, unless it is expressly stated that some other feature is essential to its operation. Each of these separable features may of course be combined with any of the other features of the examples in which it is described, or with any of the other features or combination of features of any of the other examples described herein. Furthermore, equivalents and modifications not described above may also be employed without departing from the invention.

Other examples and variations of the disclosure will be apparent to the skilled addressee in the context of the present disclosure.

The invention claimed is:

1. A rotor for an electric machine, wherein the rotor comprises:
   a central shaft;
   a rotor drum arranged radially outward of the central shaft, wherein the rotor drum comprises a hollow cylinder for carrying permanent magnets on an inner and/or outer surface of the hollow cylinder, and wherein the rotor drum is coaxial with both the central shaft and a rotational axis of the rotor; and
   a cap arranged to couple the central shaft to the rotor drum to enable the rotor drum and central shaft to rotate together about the rotational axis;
   wherein an inner portion of the cap is coupled to the central shaft at a first position along the length of the rotational axis, and an outer portion of the cap is coupled to the rotor drum at a second position along the length of the rotational axis;
   wherein the first position is at a different length along the rotational axis to the second position;
   wherein the cap is a first cap and wherein the rotor further comprises a second cap;
   wherein the second cap is arranged to couple the central shaft to the rotor drum, and wherein the second cap is offset from the first cap along the rotational axis of the rotor; and
   wherein an outer diameter of the central shaft varies along its length.

2. The rotor of claim 1, wherein the cap has a non-uniform material thickness.

3. The rotor of claim 1, wherein the cap has at least one spoke extending between the inner portion of the cap and the outer portion of the cap.

4. The rotor of claim 3, wherein each of the at least one spokes is adjacent to an aperture in the cap.

5. The rotor of claim 4, wherein the cap comprises a plurality of spokes and a plurality of apertures.

6. The rotor of claim 5, wherein the spokes in the cap are distributed uniformly about the rotational axis of rotor.

7. The rotor of claim 1, wherein an inner portion of the second cap is coupled to the central shaft at a third position along the length of the rotational axis, and an outer portion of the second cap is coupled to the rotor drum at a fourth position along the length of the rotational axis; and wherein the third position is at a different length along the rotational axis to the fourth position.

8. The rotor of claim 7, wherein the second position is closer to the fourth position than the third position on the rotational axis of the rotor.

9. The rotor of claim 8, wherein the distance between the first and second position on the rotational axis of the rotor is the same as the distance between the third and fourth position on the rotational axis of the rotor.

10. The rotor of claim 1, wherein an inner diameter of the first cap is different to an inner diameter of the second cap.

11. The rotor of claim 1, wherein the second position on the rotational axis of the rotor is closer to a central region of the shaft than the first position.

12. The rotor of claim 1, wherein an internal volume of the hollow cylinder is at least partially filed with a lightweight non-magnetic material.

13. The rotor of claim 1, wherein the central shaft is hollow.

14. The rotor of claim 1, wherein the rotor is arranged to carry the permanent magnets on an outer surface of the hollow cylinder; and wherein the rotor further comprises a liner arranged radially outward of the magnets to secure the magnets to the hollow cylinder.

15. The rotor of claim 1, wherein the rotor is arranged to carry the permanent magnets on an inner surface of the hollow cylinder, and wherein one of:

the outer portion of the cap is arranged to couple to the magnets to hold the magnets in place on the inner surface of the hollow cylinder; and the outer portion of the cap is arranged to couple to the hollow cylinder, and wherein the cap comprises a magnet contacting portion between its inner and outer portions and arranged to contact the magnets to hold the magnets in place on the inner surface.

16. A rotor for an electric machine, wherein the rotor comprises:

a central shaft;

a rotor drum arranged radially outward of the central shaft, wherein the rotor drum comprises a hollow cylinder for carrying permanent magnets on an inner and/or outer surface of the hollow cylinder, and wherein the rotor drum is coaxial with both the central shaft and a rotational axis of the rotor; and a cap arranged to couple the central shaft to the rotor drum to enable the rotor drum and central shaft to rotate together about the rotational axis;

wherein an inner portion of the cap is coupled to the central shaft at a first position along the length of the rotational axis, and an outer portion of the cap is coupled to the rotor drum at a second position along the length of the rotational axis;

wherein the first position is at a different length along the rotational axis to the second position; and wherein an outer diameter of the hollow cylinder remains constant along the length of the rotational axis, and wherein an inner diameter of the hollow cylinder varies along the length of the rotational axis.

17. The rotor of claim 16, wherein the inner diameter is larger at one or both of the axial ends of the hollow cylinder than in a central region of the hollow cylinder along the rotational axis of the rotor.

18. A rotor for an electric machine, wherein the rotor comprises:

a central shaft;

a rotor drum arranged radially outward of the central shaft, wherein the rotor drum comprises a hollow cylinder for carrying permanent magnets on an inner and/or outer surface of the hollow cylinder, and wherein the rotor drum is coaxial with both the central shaft and a rotational axis of the rotor; and a cap arranged to couple the central shaft to the rotor drum to enable the rotor drum and central shaft to rotate together about the rotational axis;

wherein an inner portion of the cap is coupled to the central shaft at a first position along the length of the rotational axis, and an outer portion of the cap is coupled to the rotor drum at a second position along the length of the rotational axis;

wherein the first position is at a different length along the rotational axis to the second position;

wherein an inner surface of the rotor drum comprises one or more recesses for receiving the cap therein, wherein the rotor comprises a plurality of permanent magnets carried by the rotor drum;

wherein the permanent magnets are arranged in a Halbach array on the inner and/or outer surface of the hollow cylinder, wherein the cap comprises at least one feature configured to be detected by a sensor to identify a rotational position of the rotor for controlling operation of a stator, and wherein a thickness of the material of the hollow cylinder is approximately the same as a thickness of the material of the cap.

* * * * *